United States Patent
McCarthy et al.

(10) Patent No.: US 6,559,657 B1
(45) Date of Patent: May 6, 2003

(54) PROBE MAPPING DIAGNOSTIC METHODS

(75) Inventors: William Patrick McCarthy, Indianapolis, IN (US); Kenneth L. Perdue, Franklin, IN (US); Donald D. Cummings, Greenwood, IN (US); Gerd Wartmann, Greenwood, IN (US)

(73) Assignee: Endress+Hauser GmbH+Co., Maulburg (DE)

( * ) Notice: Subject to any disclaimer, the term of this patent is extended or adjusted under 35 U.S.C. 154(b) by 0 days.

(21) Appl. No.: 09/229,778

(22) Filed: Jan. 12, 1999

(51) Int. Cl.[7] .......................... G01N 23/24; G01F 23/28
(52) U.S. Cl. ...................... 324/642; 324/637; 73/290 R; 73/304 R
(58) Field of Search .......................... 73/290 R, 290 V, 73/304 R, 304 C, 866.5; 324/642, 643, 644, 637

(56) References Cited

U.S. PATENT DOCUMENTS

| | | | |
|---|---|---|---|
| 2,955,466 A | 10/1960 | Coles | 73/290 R |
| 3,339,411 A | 9/1967 | Riffie | 73/304 R |
| 3,367,183 A | 2/1968 | Webster | 73/304 C |
| 3,832,900 A | 9/1974 | Ross | 73/290 R |
| 3,922,914 A | 12/1975 | Fuchs | 73/290 R |
| 3,995,212 A | 11/1976 | Ross | 324/642 |
| 4,010,537 A | 3/1977 | Oxenreider | 29/623.2 |
| 4,135,397 A | 1/1979 | Krake | 73/290 R |
| 4,301,681 A | 11/1981 | Maltby et al. | 73/304 C |
| 4,322,832 A | 3/1982 | Sartorius | 368/47 |

(List continued on next page.)

FOREIGN PATENT DOCUMENTS

| | | |
|---|---|---|
| DE | 1 648 163 | 4/1970 |
| DE | 27 44 864 | 4/1979 |
| DE | 33 37 690 | 4/1985 |
| DE | 41 18 715 | 12/1992 |
| DE | 42 04 414 | 6/1993 |
| DE | 43 08 373 | 9/1994 |
| DE | 44 04 745 | 8/1995 |
| EP | 0 260 113 | 3/1988 |
| EP | 0 534 654 | 3/1993 |
| FR | 1 230 548 | 9/1960 |
| FR | 2 626 666 | 8/1989 |
| GB | 2 064 128 | 6/1981 |
| GB | 1 599 695 | 10/1981 |
| GB | 2 079 950 | 1/1982 |
| WO | 93 24812 | 12/1993 |

OTHER PUBLICATIONS

Steven Arcone, "Conductivity Limitations in Single–Reflection Time–Domain Reflectometry," J. Phys. E. Sci. Instrum. 19 (1986), pp. 1067–1069 No month available.

Primary Examiner—N. Le
Assistant Examiner—Vincent Q. Nguyen
(74) Attorney, Agent, or Firm—Bose McKinney & Evans LLP

(57) ABSTRACT

A method and apparatus for processing a time domain reflectometry (TDR) signal having a plurality of reflection pulses to generate a valid output result corresponding to a process variable for a material in a vessel. The method includes the steps of determining a reference signal along a probe in the vessel, establishing a first fiducial reference point, a reference end of probe location, a measuring length and a maximum probe length. The method also includes the steps of periodically detecting a TDR signal along the probe, establishing a second fiducial reference point, a detected end of probe location, an end of probe peak to peak amplitude, and attempting to determine a process variable reflection on the TDR signal. The method indicates a broken cable condition, a loss of high frequency connection, a low amplitude reflection condition, an empty vessel condition. Distances and locations on the reference signal are computed in relation to the first fiducial reference point, and distances and locations on the TDR signal are computed in relation to the second fiducial reference point.

16 Claims, 22 Drawing Sheets

U.S. PATENT DOCUMENTS

| | | | |
|---|---|---|---|
| 4,408,822 A | 10/1983 | Nikitas | 439/583 |
| 4,449,405 A | 5/1984 | Franz et al. | 73/304 C |
| 4,465,088 A | 8/1984 | Vosper | 137/1 |
| 4,507,521 A | 3/1985 | Goellner | 174/151 |
| 4,698,634 A | 10/1987 | Alongi et al. | 342/22 |
| 4,713,538 A | 12/1987 | Theocharous | 250/227.23 |
| 4,743,906 A | 5/1988 | Fullerton | 342/27 |
| 4,813,057 A | 3/1989 | Fullerton | 375/259 |
| 4,944,861 A | 7/1990 | Reber | 204/428 |
| 4,979,186 A | 12/1990 | Fullerton | 375/239 |
| 5,020,374 A | 6/1991 | Petroff et al. | 73/861.25 |
| 5,122,740 A | 6/1992 | Cottam et al. | 324/173 |
| 5,122,800 A | 6/1992 | Philipp | 341/156 |
| 5,159,276 A * | 10/1992 | Reddy, III | 324/678 |
| 5,226,328 A | 7/1993 | Petroff et al. | 73/861.25 |
| 5,272,921 A | 12/1993 | Foller et al. | 73/304 R |
| 5,305,237 A | 4/1994 | Dalrymple et al. | 702/55 |
| 5,323,361 A | 6/1994 | Elle et al. | 367/98 |
| 5,333,508 A | 8/1994 | Petroff et al. | 73/861.25 |
| 5,339,861 A | 8/1994 | Smith, III | 137/614.04 |
| 5,345,471 A | 9/1994 | McEwan | 375/130 |
| 5,361,070 A | 11/1994 | McEwan | 342/21 |
| 5,363,108 A | 11/1994 | Fullerton | 342/27 |
| 5,376,888 A | 12/1994 | Hook | 324/643 |
| 5,391,839 A | 2/1995 | Lang et al. | 124/65 R |
| 5,420,517 A | 5/1995 | Skaling et al. | 324/643 |
| 5,436,580 A | 7/1995 | Kellmann et al. | 327/24 |
| 5,457,990 A | 10/1995 | Oswald et al. | 73/290 V |
| 5,517,198 A | 5/1996 | McEwan | 342/89 |
| 5,609,059 A | 3/1997 | McEwan | 73/290 R |
| 5,610,611 A | 3/1997 | McEwan | 342/89 |
| 5,614,911 A | 3/1997 | Otto et al. | 342/124 |
| 5,656,774 A | 8/1997 | Nelson et al. | 73/290 V |
| 5,661,251 A | 8/1997 | Cummings et al. | 73/866.5 |
| 5,669,263 A | 9/1997 | Borchers et al. | 73/304 R |
| 5,677,927 A | 10/1997 | Fullerton et al. | 375/630 |
| 5,689,265 A | 11/1997 | Otto et al. | 342/124 |
| 5,734,346 A | 3/1998 | Richardson et al. | 342/124 |
| 5,739,441 A | 4/1998 | Friese et al. | 73/866.5 |
| 5,767,953 A | 6/1998 | McEwan | 356/5.01 |
| 5,827,985 A | 10/1998 | Grieger et al. | 73/866.5 |
| 5,841,666 A | 11/1998 | Perdue et al. | 702/189 |
| 5,884,231 A | 3/1999 | Perdue et al. | 702/28 |

* cited by examiner

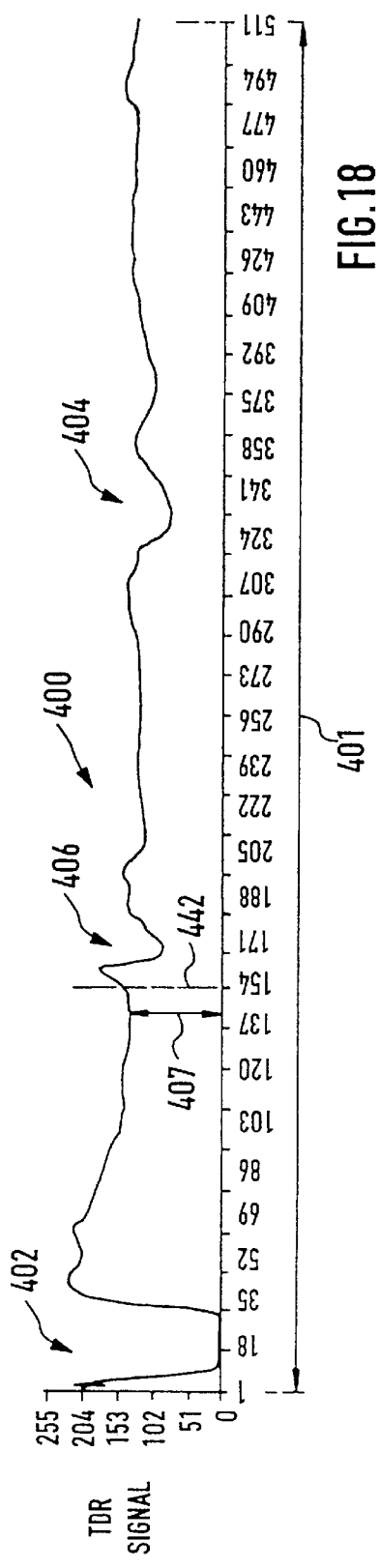
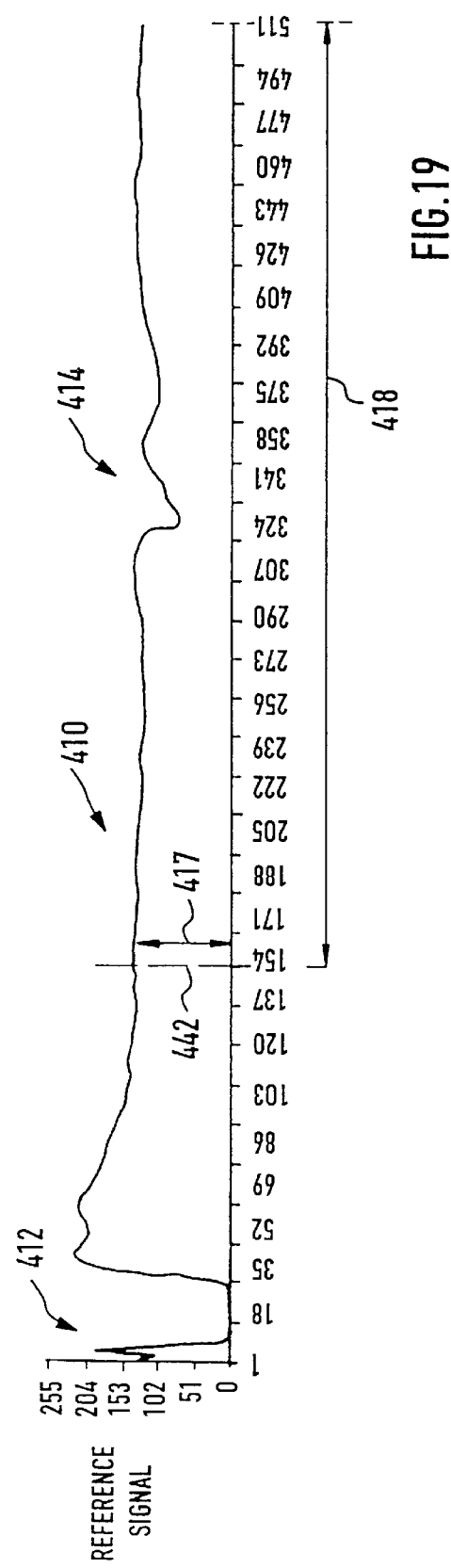

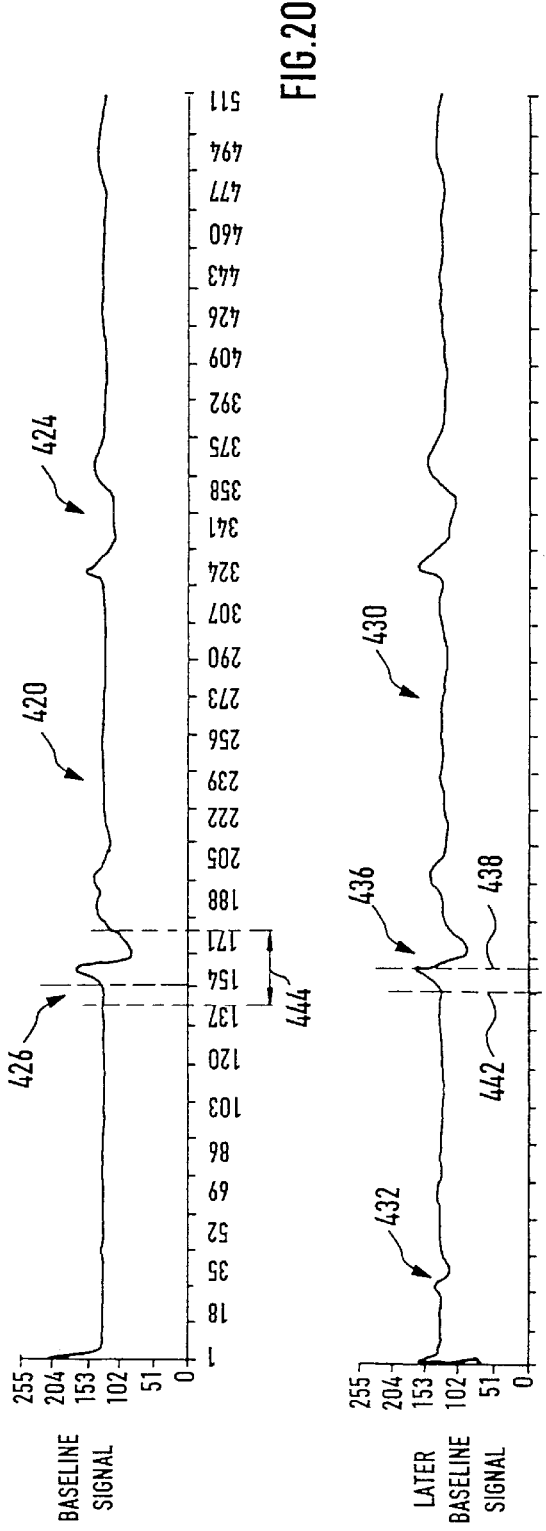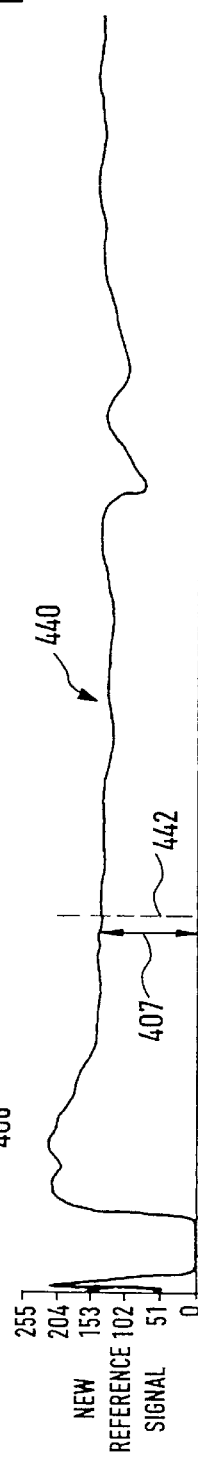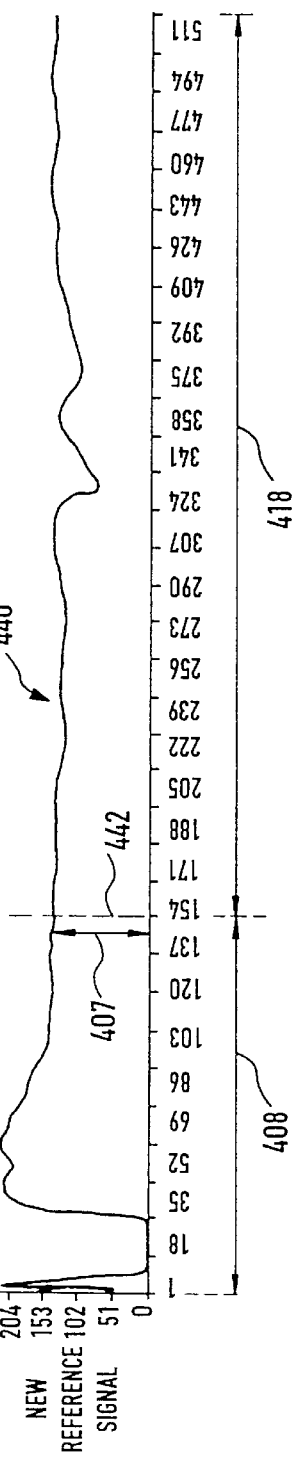

PROBE MAPPING DIAGNOSTIC METHODS

BACKGROUND OF THE INVENTION

The present invention relates to an apparatus and method for measuring a process variable. More particularly, the present invention relates to an improved method for providing an accurate indication of the location of an interface between a first medium and a second medium in a vessel using time-of-flight of signal reflections, and methods for detecting and correcting or reporting potential conditions effecting process variable measurement.

The process and storage industries have long used various types of equipment to measure process parameters such as level, flow, temperature, etc. A number of different techniques (such as mechanical, capacitance, ultrasonic, hydrostatic, etc.) provide measurement solutions for many applications. However, many other applications remain for which no available technology can provide a solution, or which cannot provide such a solution at a reasonable cost. For many applications that could benefit from a level measurement system, currently available level measurement systems are too expensive.

In certain applications, such as high volume petroleum storage, the value of the measured materials is high enough to justify high cost level measurement systems which are required for the extreme accuracy needed. Such expensive measurement systems can include a servo tank gauging system or a frequency modulated continuous wave radar system.

Further, there are many applications that exist where the need to measure level of the product is high in order to maintain product quality, conserve resources, improve safety, etc. However, lower cost measurement systems are needed in order to allow a plant to instrument its measurements fully.

There are certain process measurement applications that demand other than conventional measurement approaches. For example, applications demanding high temperature and high pressure capabilities during level measurements must typically rely on capacitance measurement. However, conventional capacitance measurement systems are vulnerable to errors induced by changing material characteristics. Further, the inherent nature of capacitance measurement techniques prevents the use of such capacitance level measurement techniques in vessels containing more than one fluid layer.

Ultrasonic time-of-flight technology has reduced concerns regarding level indications changing as material characteristics change. However, ultrasonic level measurement sensors cannot work under high temperatures, high pressures, or in vacuums. In addition, such ultrasonic sensors have a low tolerance for acoustic noise.

One technological approach to solving these problems is the use of guided wave pulses. These pulses are transmitted down a dual probe transmission line into the stored material, and are reflected from probe impedance changes which correlate with the fluid level. Process electronics then convert the time-of-flight signals into a meaningful fluid level reading. Conventional guided wave pulse techniques are very expensive due to the nature of equipment needed to produce high-quality, short pulses and to measure the time-of-flight for such short time events. Further, such probes are not a simple construction and are expensive to produce compared to simple capacitance level probes.

Recent developments by the National Laboratory System now make it possible to generate fast, low power pulses, and to time their return with very inexpensive circuits. See, for example, U.S. Pat. Nos. 5,345,471 and 5,361,070. However, this new technology alone will not permit proliferation of level measurement technology into process and storage measurement applications. The pulses generated by this new technology are broadband, and also are not square wave pulses. In addition, the generated pulses have a very low power level. Such pulses are at a frequency of 100 MHz or higher, and have an average power level of about 1 nW or lower. These factors present new problems that must be overcome to transmit the pulses down a probe and back and to process and interpret the returned pulses.

The reflected pulses can include reflections that interfere with the determination of the fiducial used in alignment of the reflected pulse for measurement of the process variable. If the wrong point is selected as the fiducial or if the fiducial varies from measurement to measurement, the system will produce erroneous results for the measurement of the process variable.

The process variable to be measured may be undetected for various reasons, including a broken probe, low amplitude reflections from the material level, loss of high frequency connection and an empty vessel. The first three of these conditions result in erroneous level measurements which must be corrected whereas the latter is a valid level measurement condition. It is important to be able to detect these conditions and differentiate between them so as to avoid erroneous results.

The process variable to be measured may produce a reflection pulse which is similar in amplitude to other pulses of the reflection signal that are unrelated to the process variable to be measured. The system must be able to determine which reflection pulse is due to the process variable to be measured in order to avoid erroneous results.

Accordingly, a need exists for a method of automatically updating the reference signal on a periodic basis to track the reflections due to factors which are unrelated to the level of material in the vessel. Thereby allowing the detection of the reflection due to the material level and the accurate reporting of the appropriate process variable.

SUMMARY OF THE INVENTION

First, a sensor apparatus must be provided for transmitting these low power, high frequency pulses down a probe and effecting their return. Such appropriate sensor apparatus is described in U.S. Pat. No. 5,661,251 entitled SENSOR APPARATUS FOR PROCESS MEASUREMENT and U.S. Pat. No. 5,827,985 entitled SENSOR APPARATUS FOR PROCESS MEASUREMENT, the disclosures of which are hereby expressly incorporated by reference into the present application.

The sensor apparatus is particularly adapted for the measurement of material levels in process vessels and storage vessels, but is not limited thereto. It is understood that the sensor apparatus may be used for measurement of other process variables such as flow, composition, dielectric constant, moisture content, etc. In the specification and claims, the term "vessel" refers to pipes, chutes, bins, tanks, reservoirs or any other storage vessels. Such storage vessels may also include fuel tanks, and a host of automotive or vehicular fluid storage systems or reservoirs for engine oil, hydraulic fluids, brake fluids, wiper fluids, coolant, power steering fluid, transmission fluid, and fuel.

The present invention propagates electromagnetic energy down an inexpensive, signal conductor transmission line as an alternative to conventional coax cable or dual transmission lines. The Goubau line lends itself to applications for a level measurement sensor where an economical rod or cable probe (i.e., a one conductor instead of a twin or dual conductor approach) is desired. The single conductor approach enables not only taking advantage of new pulse generation and detection technologies, but also constructing probes in a manner similar to economical capacitance level probes.

The present invention specifically relates to a signal processor apparatus for processing and interpreting the returned pulses from the conductor. Due to the low power, broadband pulses used in accordance with the present invention, such signal processing to provide a meaningful indication of the process variable is difficult. Conventional signal processing techniques use only simple peak detection to monitor reflections of the pulses.

The present invention provides signal processing circuitry configured for measurement of the time-of-flight of very fast, guided wave pulses. Techniques used in similar processes, such as ultrasonic level measurement are vastly different from and are insufficient for detection of guided electromagnetic wave pulses due to the differences in signal characteristics. For example, ultrasonic signals are much noisier and have large dynamic ranges of about 120 dB and higher. Guided electromagnetic waves in this context are low in noise and have low dynamic ranges (less than 10:1) compared to the ultrasonic signals, and are modified by environmental impedances. The signal processor of the present invention is configured to determine an appropriate reflection pulse of these low power signals from surrounding environmental influences.

Standard electromagnetic reflection measurements are known as time domain reflectometry (TDR). TDR devices for level measurement require the measuring of the time of flight of a transit pulse and a subsequently produced reflective pulse received at the launching site of the transit pulse. This measurement is typically accomplished by determining the time interval between the maximum amplitude of the received pulse. The determination of this time interval is done by counting the interval between the transmitted pulse and the received pulse.

The present invention provides an improved signal processor for determining a valid reflective pulse signal caused by an interface of material in contact with a probe element of a sensor apparatus. The processor apparatus of the present invention is particularly useful for processing high speed, low power pulses as discussed above. In the preferred embodiment of the signal processor apparatus, processing is performed based on a digital sampling of an analog output of the reflective pulses. It is understood, however, that similar signal processing techniques can be used on the analog signal in real time.

The present invention provides a method for processing a time domain reflectometry (TDR) signal having a plurality of reflection pulses to generate a valid output result corresponding to a process variable for a material in a vessel. The method includes the steps of determining a reference signal along a probe in the vessel and establishing a reference end of probe location using the reference signal. The method also includes the steps of periodically detecting a TDR signal along the probe, determining a detected end of probe location on said TDR signal, determining a system status based upon the difference between the reference end of probe location and the detected end of probe location, and computing the output result when the system status is functional.

The present invention provides a method for aligning the reference signal and the time domain reflectometry (TDR) signal for the computation and comparison of distances and locations. The method includes the steps of establishing a first fiducial reference point on the reference signal and establishing a second fiducial reference point on the TDR signal. The distances and locations on the reference signal are computed relative to the first fiducial reference point and the distances and locations on the TDR signal are computed relative to the second fiducial reference point. One method of establishing a fiducial reference point includes the steps of detecting the reflection in the signal having the greatest number of consecutive zero values; and establishing the fiducial reference point as the point where the reflection first crosses a fiducial threshold. An alternative method of establishing a fiducial reference point includes the steps of detecting the reflection in the signal representing the greatest uninterrupted distance of zero values; and establishing the fiducial reference point as the point where the reflection first crosses a fiducial threshold. The preferred method of establishing a fiducial reference point includes the steps of detecting the rightmost reflection in the signal having a greater width of zero values than a fiducial width threshold; and establishing the fiducial reference point as the point where the reflection first crosses a fiducial threshold.

One aspect of the present invention is the capability of detecting a broken cable condition. The method includes the steps of establishing a measuring length which is less than the reference end of probe location. A broken cable condition is detected when the detected end of probe location is less than the measuring length.

Another aspect of the present invention is the capability of detecting a loss of high frequency connector condition. The method includes the steps of establishing an end of probe peak to peak threshold, detecting an end of probe negative peak and an end of probe positive peak on the TDR signal, and computing an end of probe peak to peak amplitude as the difference between the end of probe negative peak and the end of probe positive peak. A loss of high frequency connection condition is detected when the end of probe peak to peak amplitude is less than the end of probe peak to peak threshold.

Yet another aspect of the present invention is the capability of detecting a low amplitude level reflection condition. The method includes the steps of establishing a maximum probe length which is greater than the reference end of probe location. A low amplitude level reflection condition is detected when the detected end of probe location is greater than or equal to the maximum probe length and no level reflection was detected.

A further aspect of the invention is to only indicate the low amplitude level reflection condition if it occurs over an extended period of time without an intervening level reflection being detected or an empty vessel condition being detected.

Yet a further aspect of the present invention is the capability of detecting an empty vessel condition. The method includes the steps of establishing a measuring length which is less than the reference end of probe location, and establishing a maximum probe length which is greater than the reference end of probe location. An empty vessel condition is detected when the end of probe location is greater than or equal to the measuring length, the end of probe location is less than or equal to the maximum probe length and no level reflection is detected.

Additional objects, advantages and novel features of the invention are set forth in the description that follows, and will become apparent to those skilled in the art upon reviewing the drawings in connection with the following description.

BRIEF DESCRIPTION OF THE DRAWINGS

The detailed description particularly refers to the accompanying figures in which:

FIG. 18 shows a digital TDR signal captured along the probe in the vessel;

FIG. 19 shows a digital reference signal for the probe in the vessel;

FIG. 20 shows a digital baseline signal for the probe in the vessel computed soon after the reference signal;

FIG. 21 shows a digital baseline signal for the probe in the vessel computed at a later time without interim updating of the reference signal;

FIG. 22 shows an updated reference signal;

DETAILED DESCRIPTION OF THE DRAWINGS

Figure 1:
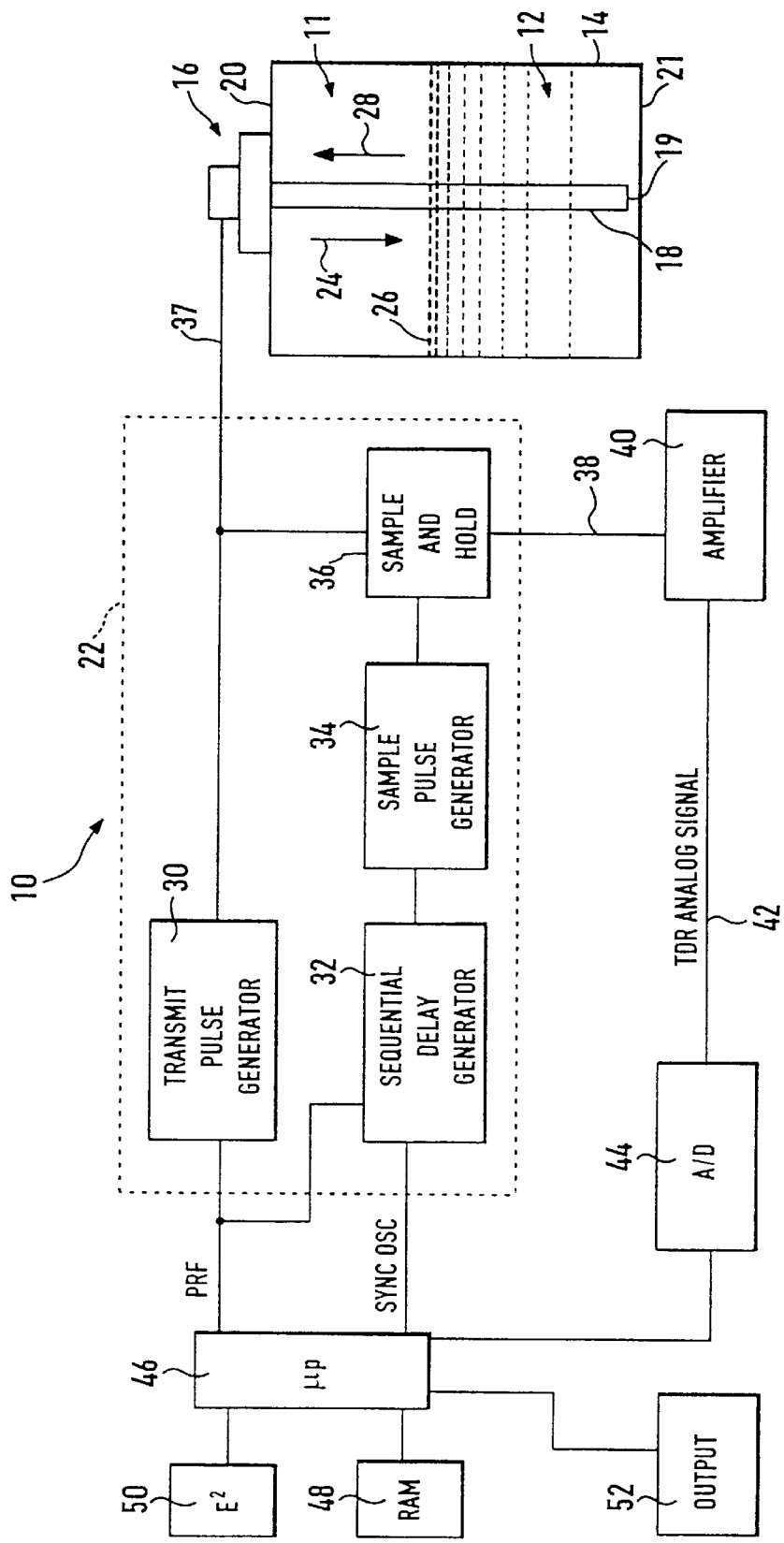
FIG. 1 is a diagrammatical view illustrating a single conductor material level sensor for measuring a level of a process variable such as a liquid in a vessel, and illustrating a block diagram of the pulse transmitter and receiver and the processing circuitry for determining the level of the process variable.

Referring now to the drawings, FIG. 1 provides a diagrammatical illustration of operation of the surface wave transmission line sensor apparatus for process measurement. The apparatus 10 is adapted for use with level measurement of a process variable such as an interface between a first medium 11 and a second medium 12 located within a storage vessel 14. Illustratively, the first medium 11 is air and the second medium 12 is a process variable such as a liquid or other material.

The present invention includes a mechanical mounting apparatus 16 for securing a single conductor transmission line or probe element 18 to a surface 20 of the vessel 14. The mechanical mounting apparatus 16 enables a transceiver 22 to transmit pulses onto the probe element 18 in the direction of arrow 24. Once the pulses reach an interface 26 between the first medium 11 and the second medium 12, such as a top surface of liquid, a reflective pulse is returned back up the probe element 18 in the direction of arrow 28.

The transceiver 22 includes a transmit pulse generator 30 which generates a series of the high frequency pulses and transmits these pulses via a cable 37 to mounting 16. Transceiver 22 also includes a sequential delay generator 32 coupled to the transmit pulse generator 30. A sample pulse generator 34 is coupled to the sequential delay generator 32. A sample and hold buffer 36 is coupled to sample pulse generator 34 and to the cable 37. Illustratively, transceiver 22 is a micropower wide band impulse radar transmitter developed by the Lawrence Livermore National Laboratory located at the University of California located in Livermore, Calif. It is understood, however, that other transceivers 22 may also be used with the signal processor apparatus of the present invention.

As discussed above, the mounting apparatus 16 must be specially designed to transmit and receive the low power, high frequency pulses. The above-referenced copending applications, the disclosures of which are expressly incorporated by reference, provide a suitable mounting apparatus 16 for transceiver 22. It is understood that the electronics and processing circuitry may be located at a remote mounting location spaced apart from the mounting apparatus 16.

An output from transceiver 22 on line 38 is coupled to an amplifier 40. An output from amplifier 40 provides a TDR analog signal on line 42. Although the preferred embodiment of the present invention uses a digital sampling system and processes digital signals related to the analog output signals, it is understood that a processor apparatus in accordance with the present invention may be built to process the analog signal directly.

In the present invention, an analog-to-digital converter 44 is coupled to amplifier 40. An output of the analog-to-digital converter 44 is coupled to an input of microprocessor 46. In the illustrated embodiment, microprocessor 46 is a MC68HC711E9 microprocessor available from Motorola. It is understood, however, that any other suitable microprocessor may be used in accordance with present invention. Microprocessor 46 is used to implement both a fast clock and a slow clock. A PRF clock implemented by microprocessor 46, which is a square wave at about 2 MHz, is coupled to transmit pulse generator 30. The microprocessor 46 also implements a sync oscillator, which is illustratively a square wave having a frequency of about 40 Hz. The sync oscillator is coupled to sequential delay generator 32.

Microprocessor 46 is also coupled to RAM 48 and to EEPROM 50. An output terminal of microprocessor 46 is coupled to an output 52. Illustratively, output 52 provides a 4–20 mA output signal to provide an indication of the level of the interface 26 between the first medium 11 and the second medium 12.

The TDR analog signal from amplifier 40 is an equivalent time signal (ETS) of the real time signal traveling on the transmission line system. The ETS is expanded in time by way of digital sampling, thereby enabling the use of conventional hardware for signal conditioning and processing. The signal processor of the present invention provides means for determining a valid pulse reflection, whether in real time or from the ETS. These results allow flexibility to determine information relating to the position of mediums 11 and 12 relative to a top surface 20, a bottom surface 21, a sensor launch plate, or an end 19 of the probe element 18. The process material positional information is derived from signal reflections caused by impedance discontinuities on the transmission line and subsequent signal processing.

The signal responses of a transmission line which includes cable 37, mounting 16, and probe element 18 are dependent upon the inherent transmission design characteristics and impedance changes created by changing boundary conditions. These boundary conditions are used to determine changes in the sensor environment and are directly or indirectly related to the amount or position of the bulk process materials being measured. The impedance of the sensor at a given location can change with variations of the sensor's environment or boundary condition due to interaction of the sensor, its signal, and its surroundings.

Figure 2:
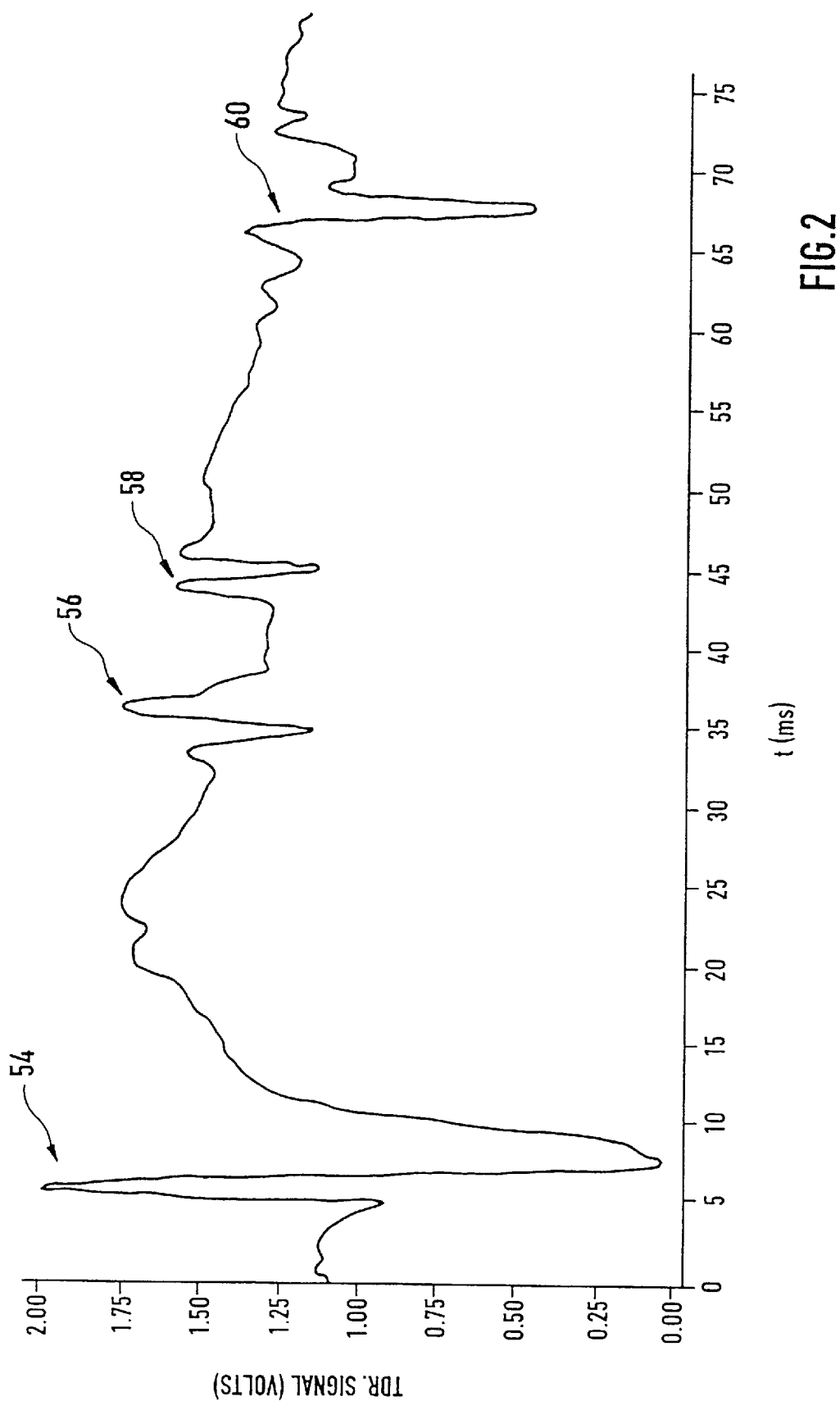
FIG. 2 is an analog signal output of the time domain reflectometry (TDR) signal generated by the transmitter and a receiver.

An example of a time domain reflectometry (TDR) analog signal from amplifier 40 is illustrated in FIG. 2. In FIG. 2, the first large voltage fluctuation or pulse 54 is generated by the impedance change in the mounting 16. In the preferred embodiment, the mounting 16 provides this impedance change as a reference reflective pulse. The second reflective pulse 56 in FIG. 2 is generated by an inherent interference within vessel 14. This interference reflection 56 may be caused by a ladder, door, weld seam, material buildup, or other internal factor from vessel 14. The third reflective pulse 58 is provided by the interface 26 between the first medium 11 and the second medium 12. The fourth reflective pulse 60 is generated by an end 19 of probe element 18.

The present invention initializes the signal processing function by characterizing or recording sensor performance at a given time or under known boundary conditions so that this initial characterization can be used as an initial boundary condition. In other words, a reference or initial boundary signal is measured and stored before the first and second mediums 11 and 12 are placed in the vessel 14.

Figure 3:
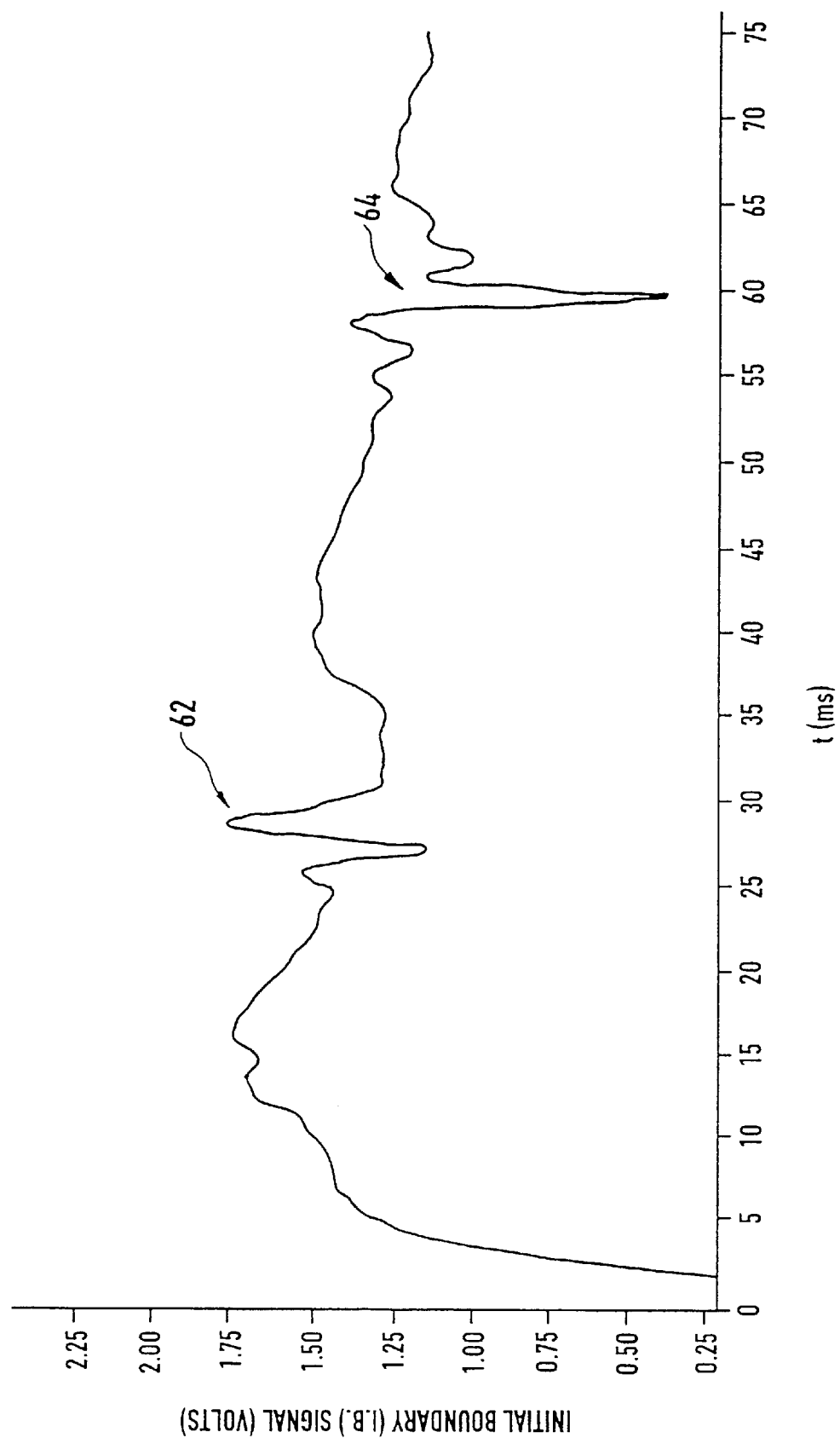
FIG. 3 is an analog output signal indicating an initial boundary condition of the inside of the vessel before the process variable is located in the vessel.

An example of an initial boundary signal (I.B.) is illustrated in FIG. 3. The initial boundary signal is used to help determine a valid impedance change induced reflective pulse caused by interface 26 between first medium 11 and second medium 12. In FIG. 3, the initial voltage peak or reflective pulse 62 is caused by the interference in the vessel 14. Pulse 62 of FIG. 3 corresponds to pulse 56 in FIG. 2. Pulse 64 in FIG. 3 corresponds to the end 19 of probe element 18.

The sensor characterization may include factory calibration, environmental characterization or probe mapping, and sensor recharacterization, or recalibration. The characterization can be done in such a way to permit use of only one or a combination of initialization procedures to provide optimum performance. The characterization of the sensor and its signals inside or outside of its installation environment such as the mounting in the vessel 14 are referred to as its initial boundary conditions.

Factory calibration may include characterizing sensor performance in a stable, known environment which provides a baseline for the system performance while neglecting the influences and effects that are encountered in field installation. A field installation, such as mounting the sensor in a tank or vessel 14, can present an environment for new boundary conditions to the sensor caused by the vessel or permanent contents of the vessel which influence the sensor response due to interaction of the sensor with these vessel contents.

The present invention provides either an automatic recharacterization or a manual recharacterization of the sensor which can be performed to re-establish a new baseline or probe map which enables these environmental changes to be accounted for in determining the valid signal indicating the desired process variable.

A second phase of the signal processor of the present invention involves detecting the pulse reflection produced by a valid signal response of the impedance change along a conductor. In other words, the processor apparatus locates the impedance pulse reflection caused by the interface 26 between the first medium 11 and the second medium 12 in contact with the probe element 18. A number of mathematical techniques can be used to determine the positional information due to impedance changes which generate a signal reflection related in time to the position of the cause of the impedance change along the probe element 18.

Figure 4:
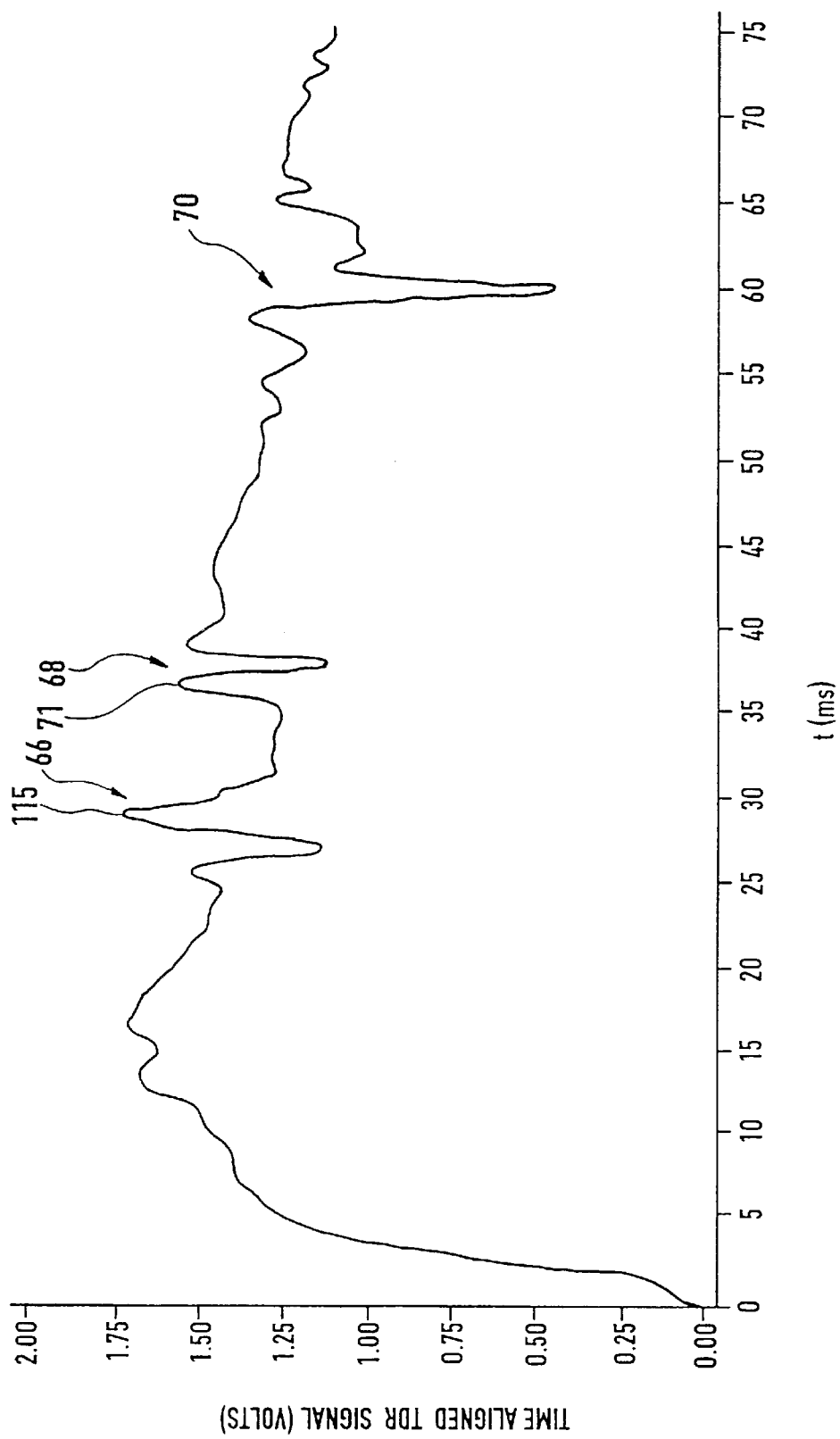
FIG. 4 is a time aligned analog TDR output signal.

Detection of impedance changes may include one or more of the following techniques applied to the TDR analog output signal illustrated in FIG. 2. One detection method is a peak amplitude detection of a Time Aligned TDR signal which is illustrated in FIG. 4. In other words, the signal of FIG. 4 is shifted so that time zero is set as the time of the initial reflecting pulse 54 provided by the impedance change at the mounting 16. In FIG. 4, the first reflection pulse 66 is caused by the interference within vessel 14. Second reflection pulse 68 is caused by interface 26. The third reflection pulse 70 is caused by end 19 of the probe element 18.

Figure 5:
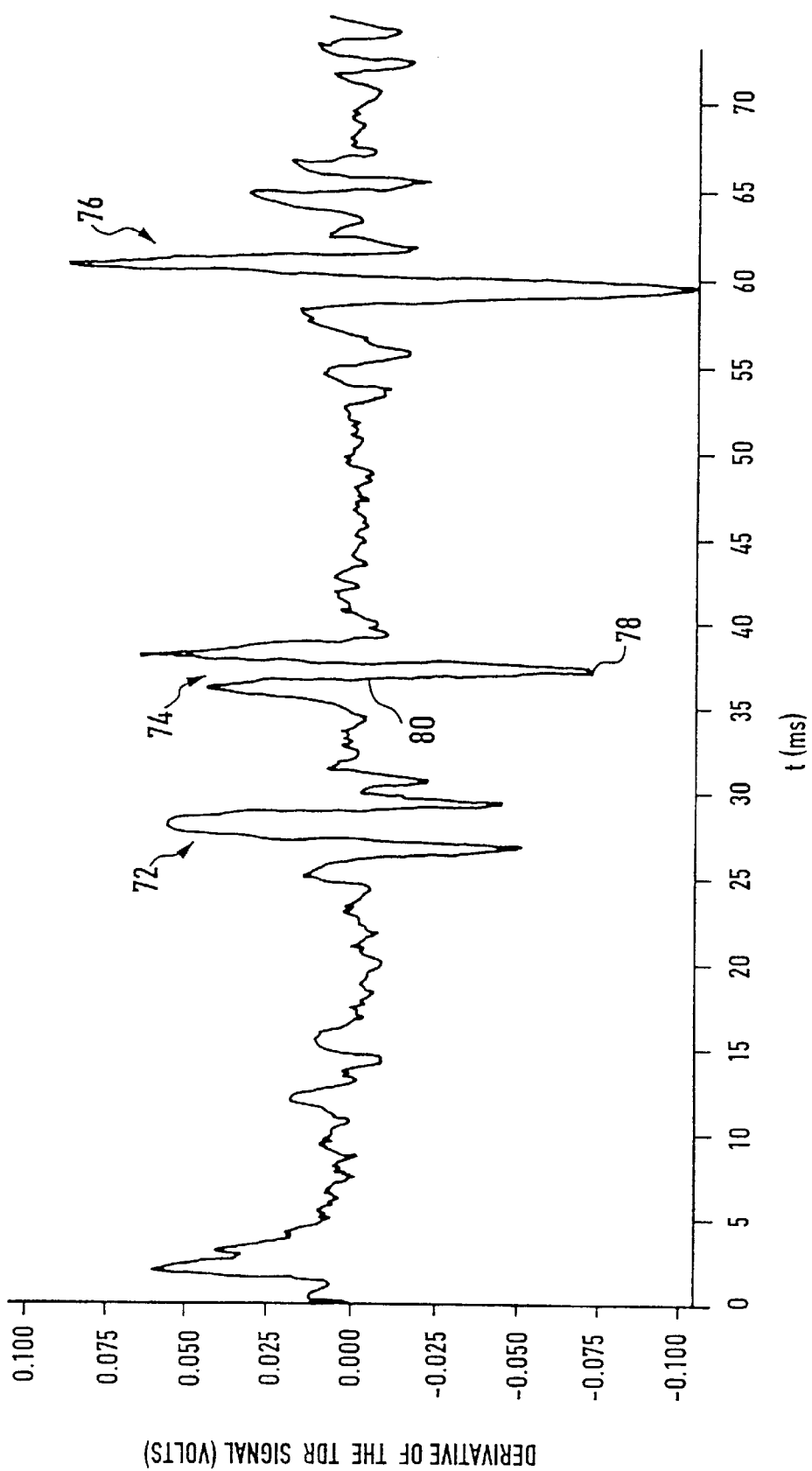
FIG. 5 is an analog derivative signal of the time aligned TDR signal of FIG. 4.

Another detection technique is to determine the first zero crossing after the positive peak of a first derivative signal of the Time Aligned TDR signal of FIG. 4. This derivative signal is illustrated in FIG. 5. Again, the first reflection pulse 72 is caused by the interference within vessel 14. The second reflection pulse 74 is caused by interface 26, and the third reflection pulse 76 is caused by end 19 of probe element 18. Using this technique, the processor apparatus determines the maximum absolute value of the peak reflective pulse, which is illustratively at location 78. If the absolute maximum was a negative value, the preceding zero crossing at location 80 is determined to be the location of interface 26. If the absolute maximum was a positive peak, the next subsequent zero crossing is used as the indication of interface 26.

Figure 6:
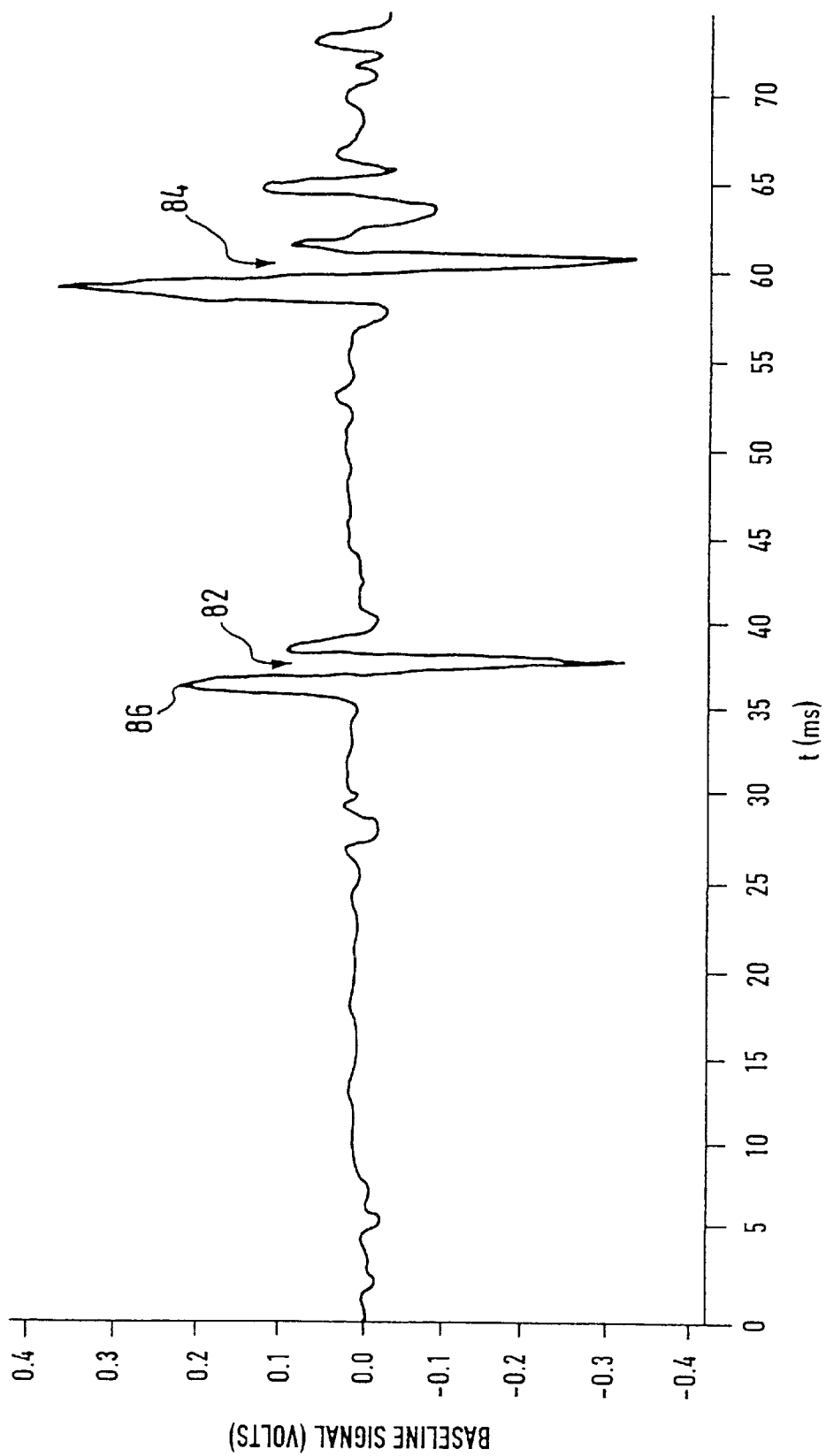
FIG. 6 is an analog baseline signal generated when the initial boundary signal of FIG. 3 is subtracted from the time aligned TDR output signal of FIG. 4.

Yet another technique for determining the valid interface 26 is the use of a baseline signal. The baseline signal is illustrated in FIG. 6. The baseline signal is determined by subtracting the initial boundary signal of FIG. 3 from the Time Aligned TDR signal of FIG. 4. Therefore, the pulse reflection 66 caused by the interference within vessel 14 is canceled by the initial boundary pulse reflection 62. In FIG. 6, the initial pulse reflection 82 is therefore caused by the interface 26 between the first medium 11 and the second medium 12. Reflective pulse 84 is caused by the end 19 of probe element 18. The processor determines the time of the greatest positive peak 86 as the pulse reflection caused by interface 26.

Figure 7:
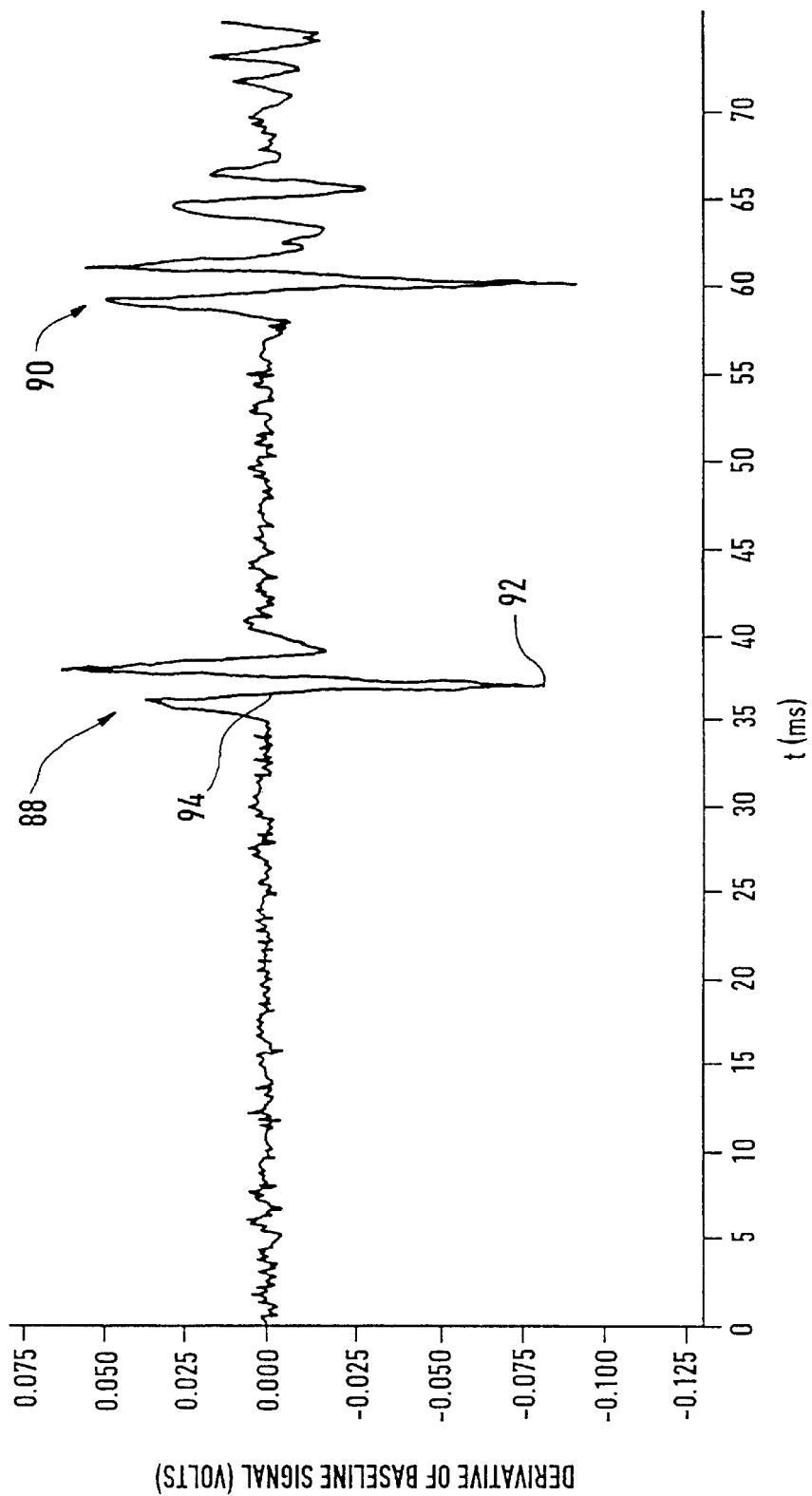
FIG. 7 is an analog signal of a derivative of the baseline signal of FIG. 6.

Still another technique for determining the actual position of interface 26 is to use the first derivative signal of the baseline signal of FIG. 6. The derivative of the baseline signal is illustrated in FIG. 7. Again, the first reflection pulse 88 is caused by the interface 26 between first medium 11 and second medium 12. The second reflection pulse 90 is caused by end 19 of probe element 18. The processor determines the peak absolute value 92 of the pulse reflection 88. Since the peak absolute value is associated with a negative voltage, the processor proceeds to the first proceeding zero crossing 94 as the time for the interface 26. If the maximum absolute value was a positive peak, the next subsequent zero crossing is used as the interface level.

Some embodiments of the present invention use a combination of two or more of the above-cited techniques to verify the data related to the valid detection of interface 26. The short term history of the signal can also be used to substantiate the validity of any change in position of the interface 26 and to verify that this change is possible within the process condition presently being used in the vicinity of the sensor.

In a preferred embodiment of the present invention, the processor determines the location of the valid impedance discontinuity caused by interface 26 between first medium 11 and second medium 12 using each of the four techniques or methods discussed above. Each method is assigned a weighted factor. In the illustrated embodiment, the baseline signal calculation illustrated in FIG. 6 is assigned a weighted factor of 1.1, while the other three techniques are assigned a weighted factor of 1.0. These weighted factors provide a means for showing the degree of agreement among the four methods. If the calculated boundary conditions as detected by the sensor creates a conflict among the four detection methods such that there is not a substantial agreement of all four methods, then a valid result is dependent upon whether there is substantial agreement between two or three of the detection methods. If there is substantial deviation in the detection of the valid impedance pulse by all four methods, then the method having the highest weighted factor is used as the valid detection.

Figure 8:
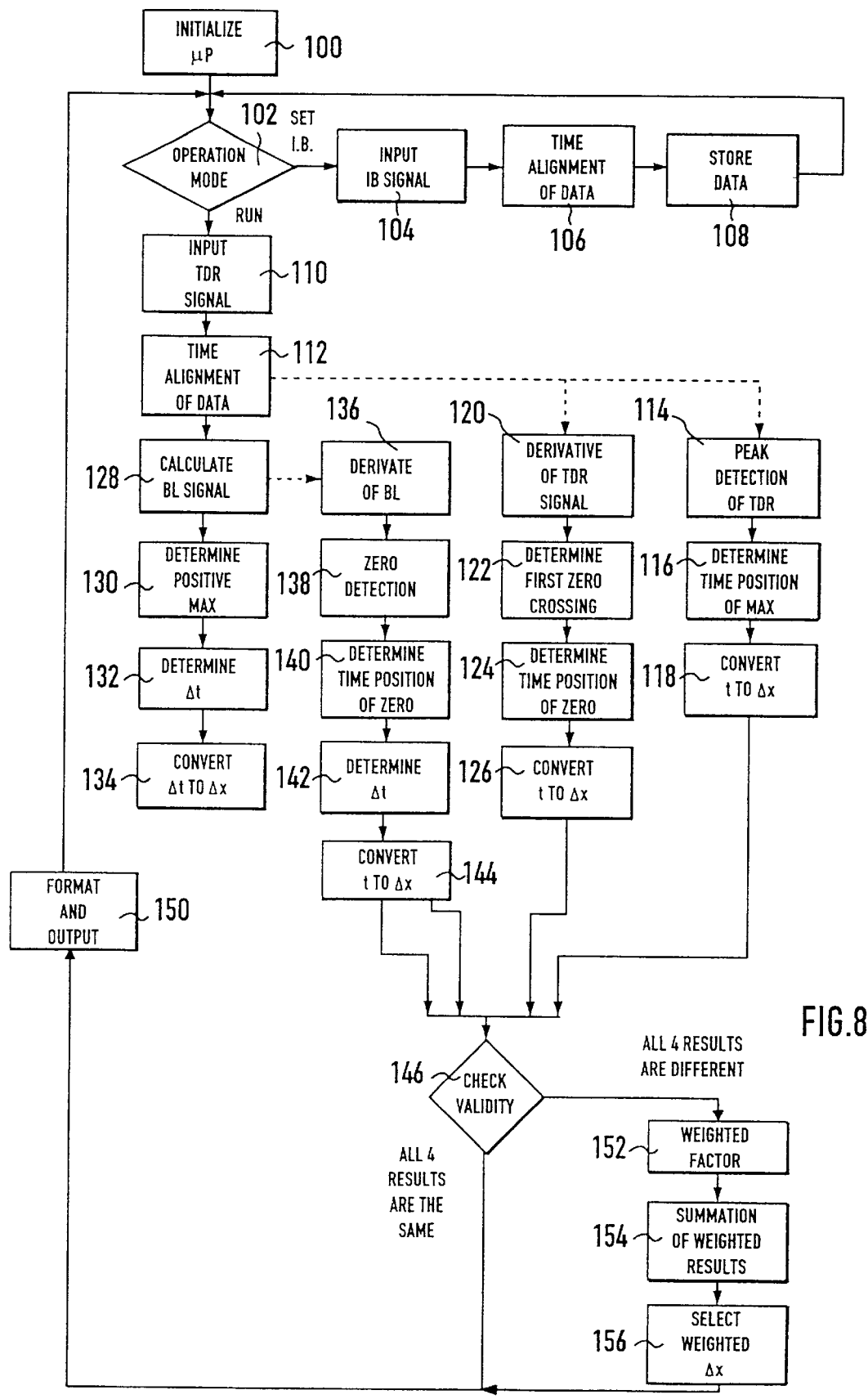
FIG. 8 is a flow chart illustrating the steps performed by the processor apparatus of the present invention to determine an actual, valid level indication of the process variable based on a reflective pulse caused by the process variable.

In the present invention, the microprocessor 46 is programmed with software to calculate the position of the valid impedance change caused by interface 26 using each of the four methods discussed above. FIG. 8 illustrates the steps performed by the microprocessor 46 of the present invention to determine the valid signal. The microprocessor 46 is first initialized as illustrated at block 100. Operation mode of the signal processor is illustrated at block 102.

The first operational mode is to set and store the initial boundary (I.B.) signal illustrated in FIG. 3. This initial boundary signal is generated before the process material is placed in vessel 14. Microprocessor 46 first receives an input initial boundary signal as illustrated at block 104. The data is then time aligned based on the initial impedance change caused by the mounting 16 as illustrated as block 106. Microprocessor 46 then stores the time aligned data related to the initial boundary conditions in the EEPROM 50 as illustrated at block 108. Once the initial boundary signal is stored, microprocessor 46 returns to operation mode at block 102.

In one embodiment, the signal processor of the present invention may establish the initial boundary conditions manually only during initial installation of the sensor apparatus 10 into the vessel 14. In another instance, the initial boundary conditions may be updated at predetermined times during operation of the signal processor.

During normal operation of the signal processor, microprocessor 46 receives an input TDR signal as illustrated at block 110. This input TDR signal is a digital representation from analog-to-digital converter 44 of the TDR analog signal illustrated in FIG. 2. Although reference will be made to the analog signals in FIGS. 2–7, it is understood that the microprocessor 46 of the present invention uses the digital representation of these signals. It is also understood that an analog processor may be used to process the analog signals in accordance with the present invention.

Microprocessor 46 next provides a time alignment of the TDR signal as illustrated at block 112. In other words, microprocessor 46 time shifts the input TDR signal so that the time zero begins at the location of the interface of mounting 16 which is indicated by the initial large reflection pulse 54 shown in FIG. 2.

In the illustrated embodiment, microprocessor 46 uses four different detection methods to locate a valid pulse reflection indicative of the interface 26 between the first medium 11 and the second medium 12. In a first method, microprocessor 46 detects a peak reflection pulse of the time aligned TDR signal (illustrated in FIG. 4) as illustrated in block 114 of FIG. 8. Peak 71 in FIG. 4 is the valid reflection pulse corresponding to interface 26. However, the peak detection step in this example would determine that peak 115 is the valid peak. Peak 115 actually corresponds to interference in vessel 14 to be the valid pulse. This explains why the peak detection method of the time aligned TDR signal, when used alone, may produce some inaccuracies. Microprocessor 46 then determines a time corresponding to the position of the maximum pulse value as illustrated at block 116 in FIG. 8. The time value is then converted to a distance between the top surface 20 of vessel 14 and the interface 26. This step is illustrated at block 118. This distance result calculated using the first detection method is then stored.

It is understood that once a time position of an impedance change on a sensor has been derived, there are a number of techniques that can be used to convert the detected time to a distance equivalent position of the interface 26 of the process variable. The time intervals between the impedance changes have a mathematical relationship such that the time relation between the impedance change is proportional to the speed of light and a continuous function of the relative dielectric constants of the subject materials. If the first medium 11 is air, the dielectric constant is substantially equal to 1.0. The subject time of the interval can then be corrected by applying the continuous functional relation relative to the material dielectric and the environmental surroundings.

Other techniques such as using a sensor or conductor of a known length and then using the relationship changes of the pulse travel times form a subject material interface to an end 19 of the probe element 18 may be used. In other words, once the location of the valid impedance pulse is determined, a time or distance between the impedance interface and the end 19 of probe element 18 can be used to determine the level of the interface 26. In the case of a sensor having a known length, differential time intervals from a material interface 26 to end 19 of the probe element 18 changes proportionally with the thickness of the subject material 12 divided by a continuous functional relationship of the material dielectric constant. Provided the probe element 18 has a fixed location relative to the vessel 14, the material level or thickness of the material is an offset relative to sensor position. This positional relationship is determined using a simple mathematical equations.

Similarly, the velocity of a pulse traveling on a sensor passing through multiple material layers can be used to determine the level of each material, provided the relative dielectric constant of each material is known. When the sensor has a fixed location relative to vessel 14, the position of each material can be determined as a function of the time differential, with an offset to the sensor position. A sensor can also be designed having markers at known distances to create signal reflections that can be used for calibration and/or determining material dielectric values.

Microprocessor 46 also calculates a derivative of the time aligned TDR signal as illustrated at block 120. An analog representation of this derivative signal is illustrated in FIG. 5. Microprocessor 46 then determines the location of a first zero crossing adjacent an absolute maximum value of the signal. If the maximum is obtained from a positive value, microprocessor 46 determines the next subsequent zero crossing after the positive peak. If the absolute maximum was obtained from a negative value, the microprocessor 46 determines the first zero crossing prior to the detected absolute maximum. This step is illustrated at block 122. Microprocessor 46 then determines a time value corresponding to the detected zero crossing as illustrated at block 124. This time value is then converted to a distance corresponding to the level of the interface 26 between first medium 11 and second medium 12 as illustrated at block 126. The distance calculated using the second detection Method is then stored.

In the third detection method, the microprocessor 46 calculates a baseline (BL) signal by subtracting the initial boundary signal stored in EEPROM 50 (FIG. 3) from the time aligned TDR signal which is illustrated in analog form in FIG. 4 as illustrated at block 128. This baseline signal is illustrated in analog form in FIG. 6. Microprocessor 46 then determines a location of the positive maximum value of the baseline signal as illustrated at block 130. This positive maximum value is illustrated at location 86 in FIG. 6. Microprocessor 46 next determines the time value corresponding to the detected positive maximum value as illustrated at block 132. Microprocessor 46 then converts the time value to a distance change indicating the location of interface 26 between the first medium 11 and second medium 12 as illustrated at block 134. The distance calculated using the third detection methods is then stored.

In the fourth detection method, Microprocessor 46 generates a first derivative of the baseline signal as illustrated at block 136. An analog representation of the first derivative of the baseline signal is illustrated in FIG. 7. Microprocessor 46 then determines a location of a zero crossing adjacent an absolute maximum value as illustrated at block 138. If the absolute maximum comes from a positive value, the next subsequent zero crossing is used. If the absolute maximum is from a negative value, the first preceding zero crossing is used as a location of interface 26. Microprocessor 46 then determines the time position of the zero crossing at block 140. In the FIG. 7 example, the first preceding zero crossing 94 adjacent negative peak 92 is used as the time position. Microprocessor 46 then determines the time change as illustrated at block 142. This time change is then converted to a distance change as illustrated at block 144 to provide an indication of the level of the interface 26 between the first medium 11 and second medium 12. This distance change calculated using the fourth detection method is then stored.

Microprocessor 46 next checks the validity of the detected distances from each of the four methods discussed above as illustrated at block 146. Each of the distance changes is rounded to a predetermined sensitivity level, for example, one millimeter. If all four stored results from each of the four methods are the same, microprocessor 46 determines that a valid output has been determined. Therefore, microprocessor formats the output into an appropriate form and sends the result to the output 52 as illustrated at block 150.

If the four stored results from the four detection methods are different, microprocessor 46 then takes into account weighted factors established for each of the detection methods as illustrated at block 152. At this point, microprocessor 46 may compare the four stored method results to a previous result. If any of the four stored results deviates from the previous result by more than a predetermined amount, the microprocessor 46 may disregard such a stored result. Microprocessor 46 provides a summation of the weighted results as illustrated at block 154. Examples of this summation by microprocessor 46 are provided below. Microprocessor 46 then selects the most appropriate distance as the valid impedance reflection from interface 26 using the weighted results at block 156. Microprocessor 46 then outputs this selected result at block 150.

Three different examples are provided to illustrated the effect of the weighted factors on the process measurement.

EXAMPLE 1

| Method | X (cm) | W.F. | Selected Result |
|---|---|---|---|
| Peak TDR | 29.0 | 1.0 | |
| Der. TDR | 36.9 | 1.0 | |
| Max. BL | 37.1 | 1.1 | 37.1 |
| Der. BL | 37.3 | 1.0 | |

EXAMPLE 2

| Method | X (cm) | W.F. | Selected Result |
|--------|--------|------|-----------------|
| Peak TDR | 36.9 | 1.0 | |
| Der. TDR | 37.3 | 1.0 | 37.3 |
| Max. BL | 37.1 | 1.1 | |
| Der. BL | 37.3 | 1.0 | |

EXAMPLE 3

| Method | X (cm) | W.F. | Selected Result |
|--------|--------|------|-----------------|
| Peak TDR | 37.1 | 1.0 | |
| Der. TDR | 37.3 | 1.0 | |
| Max. BL | 37.1 | 1.1 | 37.1 |
| Der. BL | 37.3 | 1.0 | |

In Example 1, each of the detected results for the level or distance X of the interface 26 is different. In this instance, the greatest weighted factor indicates that the maximum detected baseline value is used. Therefore, the selected result by microprocessor 46 is 37.1 cm.

In Example 2, the maximum baseline method still indicates a distance of 37.1 cm However, both the derivative of the TDR signal method and the derivative of the baseline signal method provided a result of 37.3 cm. Therefore, the distance of 37.3 cm has a weighted factor of 2.0 when the two identical results are added together. Distance 36.9 cm from the peak TDR signal method has a weighted factor of 1.0. Distance 37.1 due to the maximum baseline method has a weighted factor of 1.1. Therefore, microprocessor 46 selects the greatest weighted factor of 2.0 and the corresponding distance result of 37.3 cm during the selection step at block 156 in FIG. 8.

In Example 3, both the peak TDR method and the maximum baseline method provided a distance result of 37.1 cm. The derivative TDR method and the derivative baseline method both produced a result of 37.3 cm. Therefore, the distance 37.1 has a weighted factor of 2.1, while the distance 37.3 cm has a weighted factor of 2.0. Therefore, microprocessor 46 selects the result of 37.1 cm during the selection step at block 156.

It is understood that other detection techniques may be used in accordance with the present invention. In addition, one of the other detection techniques may be applied the highest weighted factor, if desired. In an alternate embodiment, each of the detection techniques may be assigned a different weighted factor. Such weighted factors are selected and applied on the basis of application knowledge and experience.

A further technique for determining the valid interface 26 is pattern recognition using the baseline signal illustrated in FIG. 6. The pattern recognition technique uses the entire pattern of the reflected pulse 82 shown in FIG. 6 and a number of sampled points taken after a reflected pulse 82 has reached a threshold voltage. The timing of the points must fall within specific boundaries for the pattern to be considered valid. This technique is an improvement over existing peak detection methods in that it protects against false readings due to signal-pulse spikes produced by noise and other phenomena.

Figure 9:
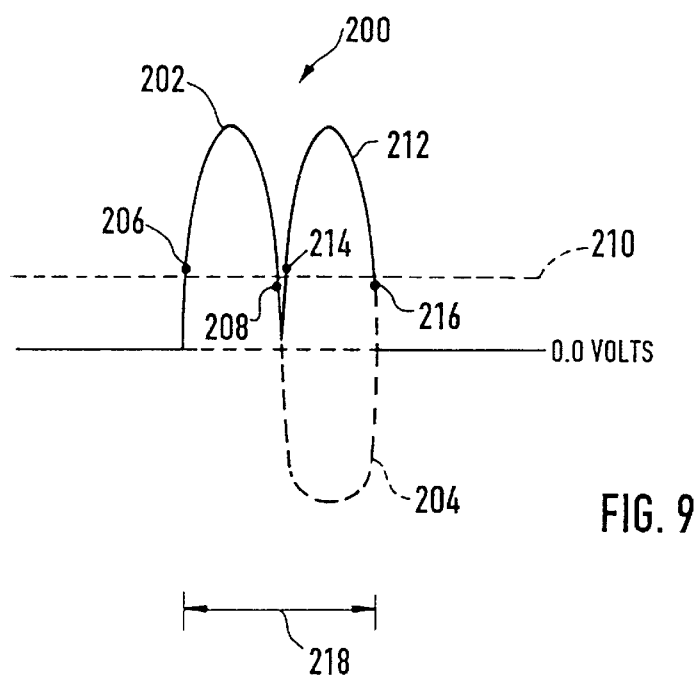
FIG. 9 is an analog baseline signal corresponding to the signal shown in FIG. 6 illustrating the pattern recognition technique of determining the valid baseline signal.

Referring to FIG. 9 a reflected signal 200 includes a positive-going component 202 and a negative-going component 204 (shown in broken lines) and is nearly sinusoidal in shape. The baseline reflected signal 200 is centered about zero volts as can be seen in FIG. 6.

In the baseline method for determining the valid interface 26, the center of positive-going component 202 of the reflected signal 200 (i.e., the process material level) is determined by identifying two points 206 and 208 on the positive-going component 202 of the reflected signal 200 with respect to a threshold voltage 210. The midpoint between these points 206 and 208 is the center of the positive going component 202 of the reflected signal 200. Points on the negative going component 204 are replaced with zeroes.

In the pattern recognition technique the points on the negative going component 206 are not replaced with zeroes. Instead the negative points are converted to their absolute value using the 2's complement technique. The 2's complement technique is well known to those skilled in the art for determining absolute value of negative signed numbers and is described and explained in standard textbooks. See for example the textbook *Digital Concepts & Applications*, published 1990 by Saunder's College Publishing (a division of Holt, Rinehart and Winston) p. 225. The result of the use of the 2's complement technique is a second positive-going component 212 creating dual positive-going peaks 202 and 212.

According to the pattern recognition technique the valid interface 26 for the process material is determined by using a four (4) point pattern and the dual positive-going peaks 202 and 212 of the entire reflected pulse 200. Once the first point 206 is detected relative to the threshold voltage 210 the second point 208, third point 214 and the fourth point 216 on the positive going peaks 202 and 212 must occur within specific time frames from the first point 206. The time frames are determined by the overall 218 width of the valid reflected pulse 200. If the four (4) points 206, 208, 214 and 216 do not occur within the specific time frames then the reflected pulse 200 is considered invalid.

If the reflected pulse 200 is found to be valid, then the center of the first positive-going peak 202 (i.e. the valid interface 26 for the process material) is determined by calculating the mid-point between the first point 206 and the second point 208. It will be understood that the number of points in the pattern need not be limited to four. Additional points could be used without departing from the scope of the present invention.

It is well known that variations in operating conditions such as; environmental variations, (temperature, humidity, pressure,) power supply variations (voltage, current, power) electromagnetic influences (rf/uwave radiated power creating biases on IC outputs) and other conditions such as mechanical vibration can induce undesired drifts of electronics parameters and output signals.

In order to compensate for drifts in time and voltage in reflected signals due to the above-described variations in operating conditions, a further embodiment of the present invention includes a corrective element or factor that is calculated every time the software executes a signal processing loop. The correction element or factor is then added to each signal sample prior to use of the baseline subtraction method described previously.

Figure 10:
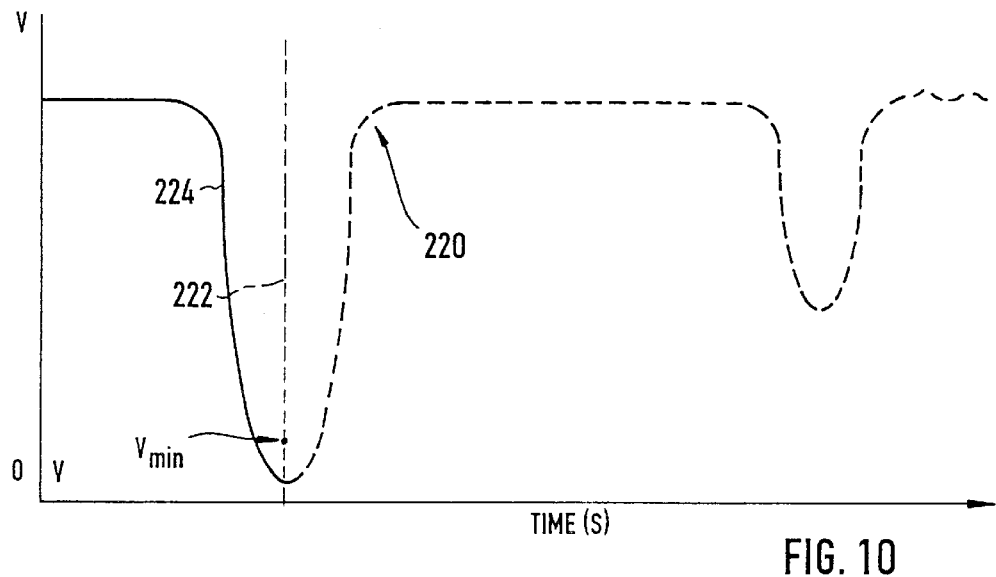
FIG. 10 is an analog initial boundary or probe map time aligned signal corresponding to FIG. 3.

Referring to FIG. 10, an initial boundary or probe map time aligned signal 220 that has been digitized and store in a microprocessor is shown. This signal 220 corresponds to signal 62 shown in FIG. 3. The signal 220 is time aligned relative a starting voltage $V_{min}$ which is located on the starting center line 222 of the negative going component 224 of the signal 220.

Figure 11:
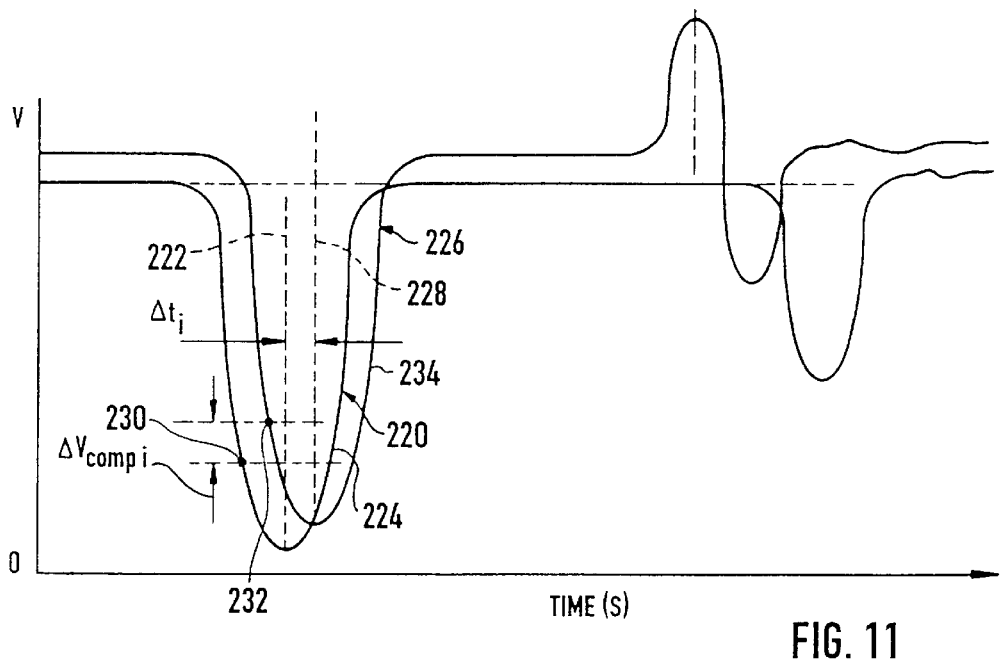
FIG. 11 is an analog illustration of the drift of a real time initial boundary signal relative to the initial boundary signal shown in FIG. 10 caused by variations in operating conditions.

FIG. 11 illustrates a situation where the real time TDR signal 226 has drifted in both time and voltage relative to the initial boundary signal 220. When the baseline procedure is used in this situation, the results will not be valid. This invalid result can be overcome and corrected to compensate for these signal drifts using the correction element or factor according the present invention. The real time TDR signal 226 has a new center line 228 which has shifted in time $\Delta t_i$ and has shifted in voltage $\Delta v_{compi}$.

The compensation can be accomplished by obtaining the time and voltage variations $\Delta t_i$ and $\Delta v_{compi}$ and adjusting the digitized real time TDR signal 226 by the drift $\Delta t_i$ and $\Delta v_{compi}$. The correction factor $V_{corr}$ is calculated by subtracting a specific point 230 on the negative-going component 224 of the initial boundary of the probe map signal 220 from its corresponding point 232 on the negative-going component 234 of the real-time TDR signal 226, then inverting the result using the 2's complement technique. This yields a number $V_{corr}$ that is always added to the real time TDR signal 226, regardless of offset polarity of the signals 220 and 226. The correction factor $V_{corre}$ is represented algebraically by the formula:

$$V_{corr} = -(V_{real} - V_{pm}),$$

where $V_{corr}$=correction factor $V_{real}$=point 232 on the real-time TDR signal 226

$V_{pm}$=corresponding point 230 on the initial boundary on the probe map signal 220

Figure 12:
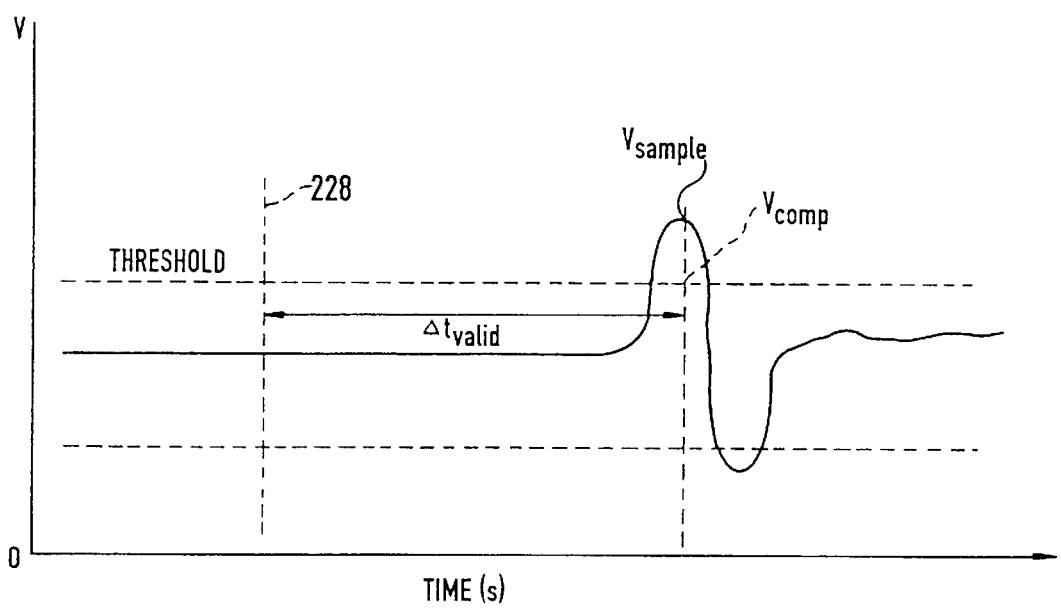
FIG. 12 is an analog illustration of a baseline signal after the application of a correction factor according to the present invention to compensate for the drift in the signal shown in FIG. 11.

The compensated sample point $V_{comp}$ (i.e. the center of the valid signal) is determined by the formula:

$$V_{comp} = V_{sample} + V_{corr},$$

where $V_{comp}$=value of the compensated sample point $V_{sample}$=value of the uncompensated point $V_{corr}$=correction factor The baseline procedure can be performed upon completion of this compensation in time and voltage. The resulting baseline signal is shown in FIG. 12. This compensated result provides a valid reflection pulse that is easily analyzed providing the desired valid and accurate $\Delta t_{valid}$.

Figure 13:
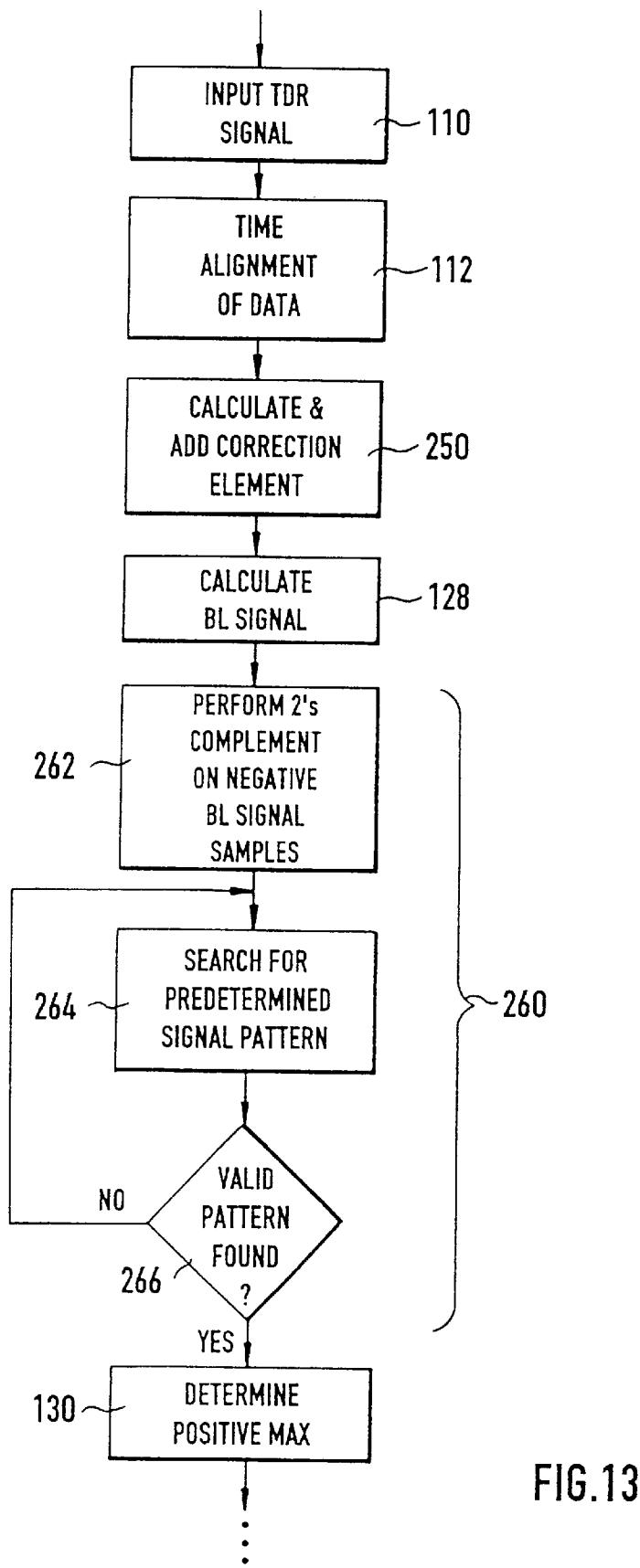
FIG. 13 is a segment of the flow chart illustrated in FIG. 8 incorporating the steps performed by the processor apparatus of the present invention to determine and apply the correction factor and to use the pattern recognition technique to determine an actual, valid level indication of the process variable based on a reflective pulse caused by the process variable.
Figure 14:
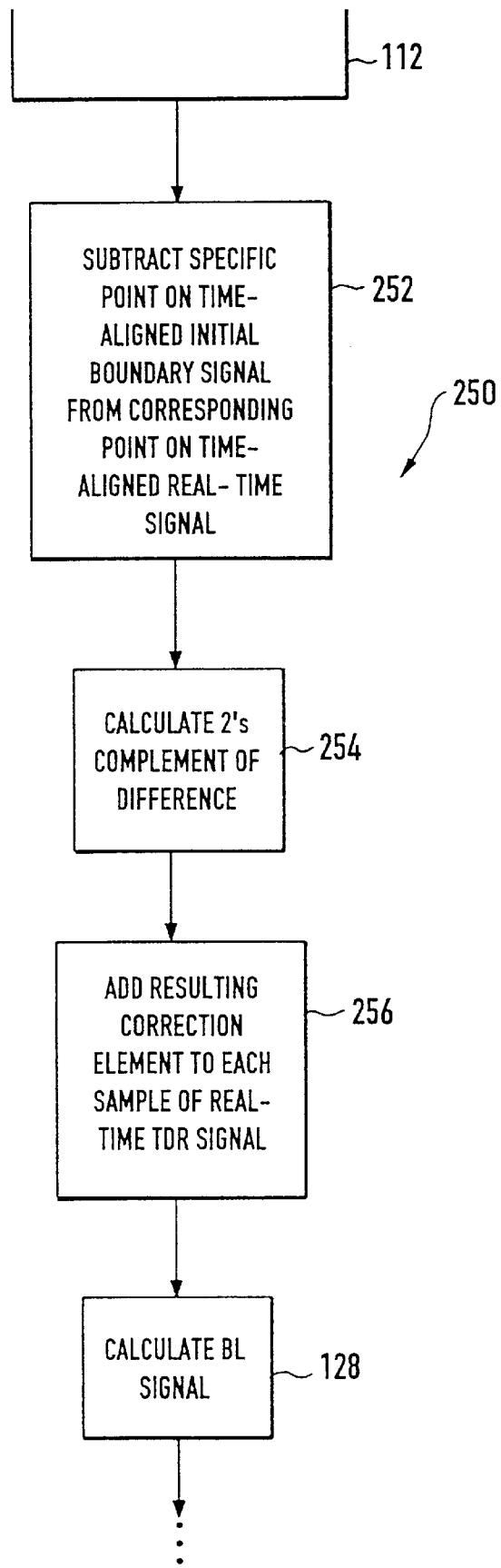
FIG. 14 is a flow chart expanding the steps performed in block 250 in FIG. 13 for calculating and adding the correction factor to the initial boundary signal.

In order to implement the pattern recognition technique and the correction factor shown illustrated in FIGS. 9–12, the software programmed in the microprocessor 46 is modified as shown in FIGS. 13 and 14. FIGS. 13 and 14 illustrate the additional steps performed by the microprocessor 46 as a result of the software modifications. The additional steps are shown inserted in the appropriate locations within the steps illustrated in FIG. 8. Thus reference numerals in FIGS. 13 and 14 corresponding to reference numerals in FIG. 8 are intended to denote the same steps. Further, although not shown in FIGS. 13 and 14, it will be understood that the remainder of the steps shown in FIG. 8 occurring before and after steps 110 and 130 respectively would be performed in connection with the steps shown in FIGS. 13 and 14. Steps 136–140, steps 120–126 and steps 114–118 would not be performed when using the pattern recognition technique. However, the correction factor could be used without the pattern recognition technique in which case all of the steps in FIG. 8 may be performed.

Referring to FIGS. 13 and 14, the step for calculating and adding the correction factor is shown in block 250 and is performed between blocks 112 and 128 in the process illustrated in FIG. 8. A more detailed breakdown of the steps performed in block 250 is shown in FIG. 14.

Referring to FIG. 14, after the microprocessor 46 provides a time alignment of the TDR signal in block 112, the microprocessor 46 then subtracts the specific point 230 on the initial boundary signal 220 from the corresponding point 232 on the real-time signal 226 in block 252 in accordance with the formula set forth above. In block 254, the microprocessor 46 then uses the 2's complement technique on the negative difference value between points 232 and 230.

After the 2's complement technique is applied then the correction factor $V_{corr}$ determined in block 252 is added to the uncompensated sample point of the real time TDR signal to produce a value of the compensated sample point $V_{comp}$. Thereafter, the microprocessor 46 calculates a baseline (BL) signal by subtracting the initial boundary signal from the time aligned and corrected TDR signal to produce the baseline signal illustrated in analog form in FIG. 12. It will be understood that after block 123 the microprocessor 46 may proceed to block 136, block 120, block 114 or use the pattern recognition technique as shown in FIG. 13 at 260.

Using the pattern recognition technique the microprocessor 46 first uses the 2's complement technique on the negative-going component 204 of the baseline signal 200 (See FIG. 9) in block 262. Thereafter the microprocessor 46 searches for the predetermine four (4) point pattern (determined based upon the width 218 of the signal) in block 264 as shown in FIG. 9. If the predetermined pattern is not found then the microprocessor 46 continues to search baseline signal samples until a valid pattern is found. This step is performed in block 266. Once a valid pattern is found, then the microprocessor 46 determines a location of the positive maximum value of the valid baseline signal in block 130 shown in FIG. 8.

In order to determine the baseline signal shown in FIG. 6, the initial boundary signal of FIG. 3 is subtracted from the time aligned TDR signal of FIG. 4. Ideally the initial boundary signal or probe map over the entire sensor length is measured and stored before the first and second mediums 11 and 12 are placed in the vessel 14. In practice, it is often impractical to empty the vessel 14 to determine an initial boundary signal every time a probe 18 is installed in the vessel 14 or when for another reason the initial background signal needs to be updated. When the probe 18 is installed in the vessel 14 containing material 12, a portion of the probe 18 above the interface 26 is not immersed in the material 12 and a portion of the probe 18 below the interface 26 is immersed in the material 12. Partial probe mapping combines a portion of the field measured sample TDR signal with a portion of a background signal determined at the factory or in the field to generate an initial boundary signal for the entire length of the probe 18 without having to empty the vessel 14. The partial probe mapping can be done immediately after installation of the probe 18 or during operation to update the initial boundary signal.

Figure 15:
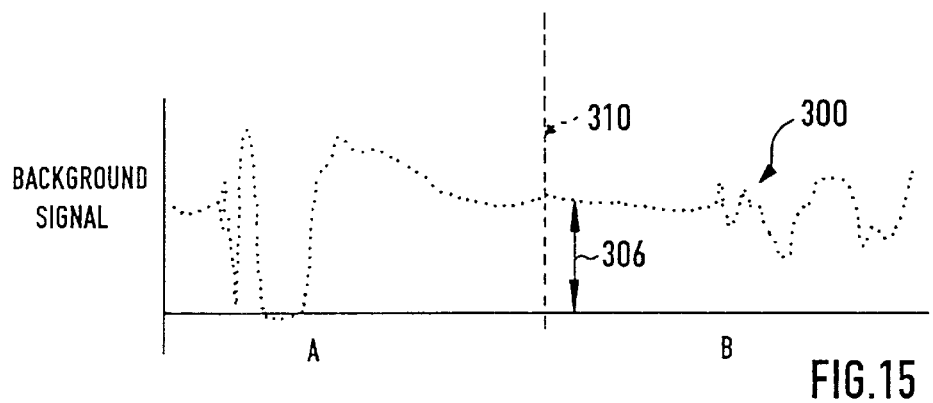
FIG. 15 shows a background signal for the probe.
Figure 16:
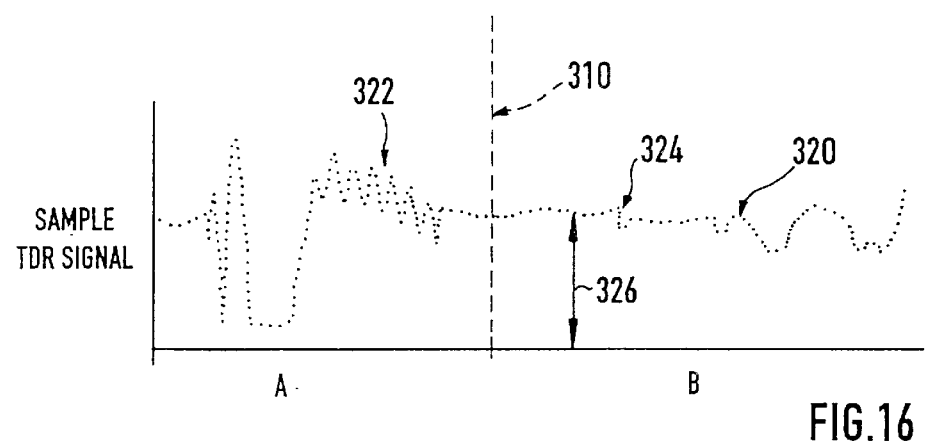
FIG. 16 shows a sample TDR signal captured in the vessel.
Figure 17:
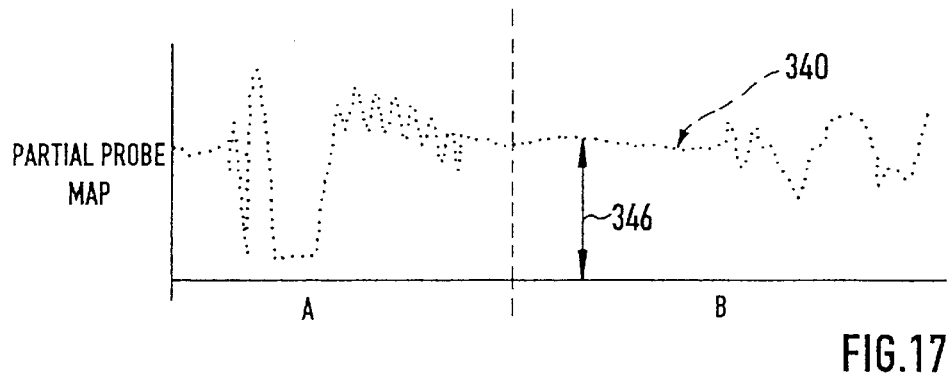
FIG. 17 shows a partial probe map generated by combining portions of the background signal and portions of the sample TDR signal.

The partial probe mapping process is illustrated in FIGS. 15, 16 and 17. FIG. 15 shows a background signal 300 stored for the probe 18. The background signal 300 is either initially measured at the factory or determined at the installation site and stored in EEPROM 50 for later use with the probe 18. The background signal 300 is divided by a transition point 310; portion A is the signal for the portion of the probe 18 above the transition point 310, the upper portion, and portion B is the signal for the portion of the probe 18 below the transition point 310, the lower portion.

FIG. 16 shows a sample TDR signal 320 sensed by the probe 18 installed in the vessel 14 when the probe 18 is partially immersed in the material 12. The sample TDR signal 320 is captured for the generation of a partial probe map. The sample TDR signal 320 includes several reflective pulses 322 caused by internal structures of the mounting structure and artifacts of the vessel 14. The sample TDR signal 320 is divided by a transition point 310 corresponding to the transition point 310 for the background signal 300; portion A is the signal for the portion of the probe 18 above the transition point 310, the upper portion, and portion B is the signal for the portion of the probe 18 below the transition point 310, the lower portion. The transition point 310 is chosen such that portion A of the sample TDR signal 320 is for a portion of the probe 18 which is not immersed in or in contact with the material 12 and is hanging straight. The reflected level of the interface 26 with the material 12 is indicated by the fluctuation 324 in the sample TDR signal 320.

FIG. 17 shows a partial probe map 340. The partial probe map 340 is computed by combining the non-immersed probe range up to a transition point 310 from the sample TDR signal 320 with the remainder of the probe range stored in the background signal 300. Thus, the resulting partial probe map 340 shown in FIG. 17 is a combination of the sample TDR signal 320 above the transition point 310, portion A of FIG. 16, with the background signal 300 below the transition point 310, portion B of FIG. 15. An adjustment is needed at the transition point 310 to account for the difference in the offset 306 of the background signal 300 and the offset 326 of the sample TDR signal 320. This adjustment accounts for offset drift of the sample TDR signal, noise and ringing attenuation, as well as reflections from extraneous objects in the vessel 14 not mapped previously. After adjustment the partial probe map 340 has an offset 346.

A minimum probe range or length of 5 meters (15 feet) is preferred for performing a partial probe map. The transition point 310 should be chosen such that it is above the interface 26 with the material 12, while at the same time being at least 1 meter below the interface between the probe 18 and the mounting apparatus 16. For accuracy, partial probe mapping should not be performed near the end of the probe length.

The calculation of the adjustment to the offset 326 of the sample TDR signal 320 and to the offset 306 of the background signal 300 at the transition point 310 is required for an accurate partial probe mapping. The adjustment is applied to the offset 306 of portion B of the background signal 300 to smooth the partial probe map 340 at the transition point 310. If the adjustment is not made then there is a discontinuity in the partial probe map 340 at the transition point 310, the discontinuity could be interpreted as a signal showing the level of the material 12 in the vessel 14. The adjustment value can be computed by many methods some of which are described below.

One method of computing the adjustment is simply to calculate the difference between the sample TDR signal 320 at the transition point 310 and the background signal 300 at the transition point 310. This will assure an equal signal value for both the sample TDR signal 320 and the background signal 300 at the transition point 310 eliminating any discontinuity in the partial probe map 340.

In order to overcome fluctuations in the sample TDR signal 320 and the background signal 300 around the transition point 310 a more robust adjustment calculation may be required such as performing averaging or root mean square (RMS) calculations over portions of the two signals. The more robust adjustment calculations, such as averaging or RMS, could be done over the entire range of the signal or over a smaller portion of the signal. Accordingly, a second method is to compute the adjustment as the difference between the average values of the two signal portions used to generate the partial probe map 340. This is the difference between the average signal value over portion B of the background signal 300 and the average signal value over portion A of the sample TDR signal 320. A third method is to compute the adjustment as the difference between the average values over the lower portions of the two signals. This is the difference between the average signal value over portion B of both the background signal 300 and the sample TDR signal 320. A fourth method is to compute the adjustment as the difference between the average value over the entire range of both signals. This is the difference between the average signal value over the entire range of the background signal 300 and the average signal value over the entire range of the sample TDR signal 320. A fifth method is to compute the adjustment as the difference between the average values of the upper portions of the two signals. This is the difference between the average signal value over portion A of the background signal 300 and the average signal value over portion A of the sample TDR signal 320. In the preferred embodiment, the third method is used.

Instead of using the entire probe range to compute the adjustment value a smaller interval on the background signal 300 and the sample TDR signal 320 could be used. Another alternative method is to compute the adjustment as the difference between the average signal value over a small interval surrounding the transition point 310. This could be the difference between the average signal value over a small interval of portion A of the background signal 300 near the transition point 310 and the average signal value over a small interval of portion A of the sample TDR signal 320 near the transition point 310. For example for digitized signals, the adjustment could be the difference between the average of the four sample points in portion A of the background signal 300 nearest the transition point 310 and the average of the four sample points in portion A of the sample TDR signal 320 nearest the transition point 310.

The partial probe map 340, which is a combination of portion A of the sample TDR signal 320 and portion B of the background signal 300 adjusted by the chosen adjustment factor, is stored for use as the initial boundary signal. This initial boundary signal is used as previously described to determine the level of the material 12 in the vessel 14.

The level measurement calculations discussed above involve three primary signals: a TDR signal, a reference signal and a baseline signal. The TDR signal is a measurement signal containing reflections of the signal transmitted along the probe 18. The TDR signal is collected as an analog signal by the transceiver 22 and passes through the amplifier 40. The preferred embodiment uses the analog-to-digital convertor 44 to transform the analog TDR signal into a digital TDR signal. An example of a digital TDR signal 400 is shown in FIG. 18. However it is understood that a processor apparatus in accordance with the present invention could be built to process the analog TDR signal directly. In the TDR signal 400, the first large reflective pulse 402 is due to the impedance change at the mounting 16, the second large reflective pulse 406 is due to the material level 26, and the third large reflective pulse 404 is due to the end 19 of the probe 18.

The reference signal is used to map background reflections due to artifacts of the measurement environment and other factors that are not related to the level to be measured.

FIG. 19 shows a reference signal 410. In the reference signal 410, the first large reflective pulse 412 is due to the impedance change at the mounting 16 and the second large reflective pulse 414 is due to the end 19 of probe 18. There are several reference signals stored in EEPROM 50 which are selectable for use in level measurement calculations based on the mode setting for the system. The reference signals that are available include: a factory reference signal, a user reference signal, a partial probe map and a periodic probe map. The factory reference signal is measured at the sensor manufacturing facility, usually in a stable, known environment to characterize sensor performance, prior to shipment of the sensor to the user. The factory reference signal is stored in all four reference signal locations prior to shipment. The user reference signal is determined by the user, preferably in the actual environment in which the measurements will be made when the vessel 14 is empty. This provides a reference signal for the entire probe length that accounts for vessel artifacts and other influences in the actual measurement environment that cause background signal reflections. The partial probe map is computed by combining the non-immersed probe range of a TDR signal (FIG. 16) with the remainder of the probe range from a prior reference signal (FIG. 15). Partial probe mapping enables calculation of a reference signal 410 when it is not practical to empty the vessel 14. Performance of partial probe mapping requires user intervention. The periodic probe map, similar to the partial probe map, combines the non-immersed probe range of a TDR signal with the remainder of the probe range from the prior reference signal. However, periodic probe mapping is performed automatically without user intervention, as will be explained below. The mode of the apparatus 10 can be set to use the desired reference signal. To conserve memory, only the reference signal used in the selected mode is maintained in RAM 48.

The baseline signal is calculated by subtracting the reference signal from the TDR signal. An offset can be added to the result of the subtraction in order to eliminate negative values in the baseline signal 420. FIG. 20 shows a baseline signal 420 calculated by subtracting the reference signal 410 from the TDR signal 400 and adding an offset of 128 counts which is half of the range of the vertical axis. In the baseline signal 420 shown in FIG. 20, the first large reflective pulse 426 is due to the material level 26, and the second large reflective pulse 424 is due to changes in the reflection at the end 19 of probe 18. The reflections 402, 412 due to the impedance change at the mounting 16 are cancelled out in the subtraction of the reference signal 410 from the TDR signal 400.

All three of the signals 400, 410, 420 have the same units. The vertical axis has units of digital voltage counts that represent the amplitude of the pulses. In FIGS. 18–20, the amplitude information is depicted using eight bits which allows for 256 counts. Thus, for a voltage range of 5 V, a voltage count equals approximately 20 mV (5V/256 counts). The horizontal axis has units of digital time counts that represent time until reception of the associated pulse amplitude. Each digital time count also represents a digital distance count, since time is directly related to distance by the propagation speed of the pulse. In FIGS. 18–20, the time or distance information is depicted using nine bits which allows for 512 counts on the horizontal axis. A probe map length 401 is the total distance or length covered by the distance counts of the horizontal axis. Thus, for a distance count of 10 mm and 512 counts on the horizontal axis, the probe map length 401 is 5.12 m (10 mm/count*512 counts).

The resolution of the distance measurements are inversely proportional to the probe map length 401. As the length of the probe 18 is shortened, the probe map length 401 can be shortened by decreasing the magnitude of the distance counts. Decreasing the magnitude of the distance counts increases the resolution of the distance measurements.

As long as conditions in the vessel 14 have not changed, the baseline signal 420 is free of most background noise and the reflective pulse due to the material level 26 is the first large reflective pulse 426. Unfortunately over time, the TDR response varies from the reference signal 410. Since these variations are not contained in the reference signal 410 until it is updated, these variations are not cancelled by the subtraction of the reference signal 410 from the TDR signal 400 and appear as reflection pulses in the baseline signal 420. Many factors unrelated to the level 26 of the material 12 cause the TDR signal 400 to change over time. These factors include buildup of material on the probe 18, temperature changes, changing conditions of the vessel 14, and changing mounting conditions. As shown in FIG. 20, the baseline signal 420 is "clean" immediately following a probe map. But variations over time cause the baseline signal to become increasingly noisier. A later baseline signal 430, shown in FIG. 21, is the result of subtracting the earlier calculated reference signal 410 from a current TDR signal. The variations in background noise that occurred in the interim, between collection of the reference signal 410 and the current TDR signal, have caused a noise pulse 432 prior to the level reflection pulse 436 in the later baseline signal 430. The noise pulse 432 could potentially be misinterpreted as a level reflection and result in erroneous level measurements. Initially the noise does not affect the measurement because the amplitude of the level reflection pulse 436 is greater than the noise pulse 432, but left unchecked, the noise pulse 432 may grow and eventually become equal to or greater than the amplitude of the level reflection pulse 436.

The process of periodic probe mapping addresses the issue of keeping the reference signal 410 current so that variations contained in the TDR signal 400 due to background factors are accounted for in computing the baseline signal 420. As long as the reference signal 410 is "periodically" updated, the baseline signal 420 remains much more noise free. Periodic probe mapping is similar to partial probe mapping except instead of the user manually activating the partial probe mapping process and entering the transition point, the periodic probe map process automatically activates the mapping process and determines the transition point from the level reflection of the TDR signal used in the periodic probe mapping process.

As with partial mapping, periodic mapping fits the upper portion of a current TDR signal with the lower portion of a reference signal to calculate a new reference signal. Periodic probe mapping starts with a reference signal 410 which is updated by each periodic probe mapping operation. The original reference signal used in periodic probe mapping can be supplied by any of the reference signal determination methods used in the various system modes.

To prevent mapping out a portion of the level reflection pulse 406, periodic probe mapping waits until the level 26 of material 12 in the vessel 14 is stable. The level 26 is considered stable enough for automatic activation of periodic probe mapping if the level reflection pulse 426 of the baseline signal 420, which corresponds to the level reflection pulse 406 of the TDR signal 400, remains within a reflection window 444 for a set number of level measurements. The stability requirement for activation of periodic probe mapping is increased by narrowing the reflection window 444. A reflection window counter tracks the number of consecutive times the level reflection pulse 426 remains within the reflection window 444. When the level reflection pulse 426 is outside the reflection window 444, the reflection window counter is reset to zero and the bounds of the reflection window 444 are reset. When the level reflection pulse 426 remains within the reflection window 444 for the user selected number of consecutive level measurements then periodic probe mapping is automatically activated. A preferred embodiment of the invention requires four consecutive level reflections at the same level, i.e. the reflection window 444 having a width of 0 distance counts.

When periodic probe mapping is activated, a TDR signal 400 is collected and a current baseline signal 430 is calculated. The level reflection location 438 in the level reflection pulse 436 is determined. A transition point 442 is chosen which is sufficiently before the level reflection location 438 based upon the probe map length 401 and the level reflection location 438. Table A lists the preferred location of the transition point 442 relative to the level reflection location 438 for different probe map lengths 401 in terms of the number of distance counts the transition point 442 should be prior to the level reflection location 438.

TABLE A

| Probe Map Length | Resolution of Distance Counts | Transition Point Location in Number of Distance Counts Prior to Level Reflection Location |
| --- | --- | --- |
| <3 m | 6.53 mm | 10 |
| <6 m | 13.06 mm | 5 |
| <6 m | 19.59 mm | 4 |
| <9 m | 26.12 mm | 3 |
| <12 m | 32.65 mm | 3 |
| <15 m | 39.18 mm | 3 |
| <18 m | 45.71 mm | 3 |
| <=20 m | 52.24 mm | 3 |

The transition point 442 is also found on the prior reference signal 410, the transition point 442 representing the same location along the probe 18 in both signals. An upper portion 408 of the TDR signal 400 prior to the transition point 442 is combined with a lower portion 418 of the prior reference signal 410 following the transition point 442 to form a new reference signal 440. An offset adjustment is applied to eliminate any discontinuity in the portions 408, 418 at the transition point 442 in the new reference signal 440.

The offset adjustment smooths the new reference signal 440 at the transition point 442 due to differences in the signal level 417 in the prior reference signal 410 and the signal level 407 in the TDR signal 400. The offset adjustment is applied to the portion 418 of the prior reference signal 410 following the transition point 442 to smooth the new reference signal 440 at the transition point 442. If the adjustment is not made, there may be a discontinuity in the new reference signal 440 at the transition point 442, the discontinuity could be interpreted as a level reflection signal and cause erroneous level measurements. The offset adjustment value can be computed by many methods including those described previously in regard to partial probe mapping.

The new reference signal 440 that results from periodic probe mapping is then used as the reference signal in level measurement calculations and is later used as the prior reference signal in computing a newer new reference signal. The new reference signal 440 is held in RAM 48 for use in level measurement calculations and periodically transferred to EEPROM 50. The rate at which the new reference signal 440 is transferred to EEPROM 50 is selectable by the user.

In order to reduce the amount of RAM 48 necessary for the system 10 the probe mapping and level measurement operations can be performed without actually storing the current TDR signal 400. Every time a level measurement is performed, the TDR signal 400 is received by the microprocessor 46 as a sequential stream of digital voltage samples from the analog-to-digital convertor 44 which represent the amplitude of the reflection pulse at a different location proceeding along the probe map length 401 from the mounting 16 to the end 19 of the probe 18. In the exemplary embodiment there are 512 samples along the probe map length 401. One method of performing level measurements is to store all 512 samples of the TDR signal 400 along with all 512 samples of the reference signal 410, and take the difference plus an offset to compute all 512 samples of the baseline signal 420. This method requires that 1.5 Kbytes of the RAM 48 be allotted to store these three signals. The preferred method is to store the reference signal 410 in RAM 48 and to compute the 512 samples of the baseline signal 420 point by point as each point of the TDR signal 400 is received by the microprocessor 46. The preferred method only requires that 1.0 Kbytes of RAM 48 be allotted to store the reference signal 410 and the baseline signal 420. When the calculations require a sample from the TDR signal 400, the required sample can be reconstructed by adding the corresponding sample from the reference signal 410 to the corresponding sample from the baseline signal 420 and subtracting the baseline offset.

Figure 23:
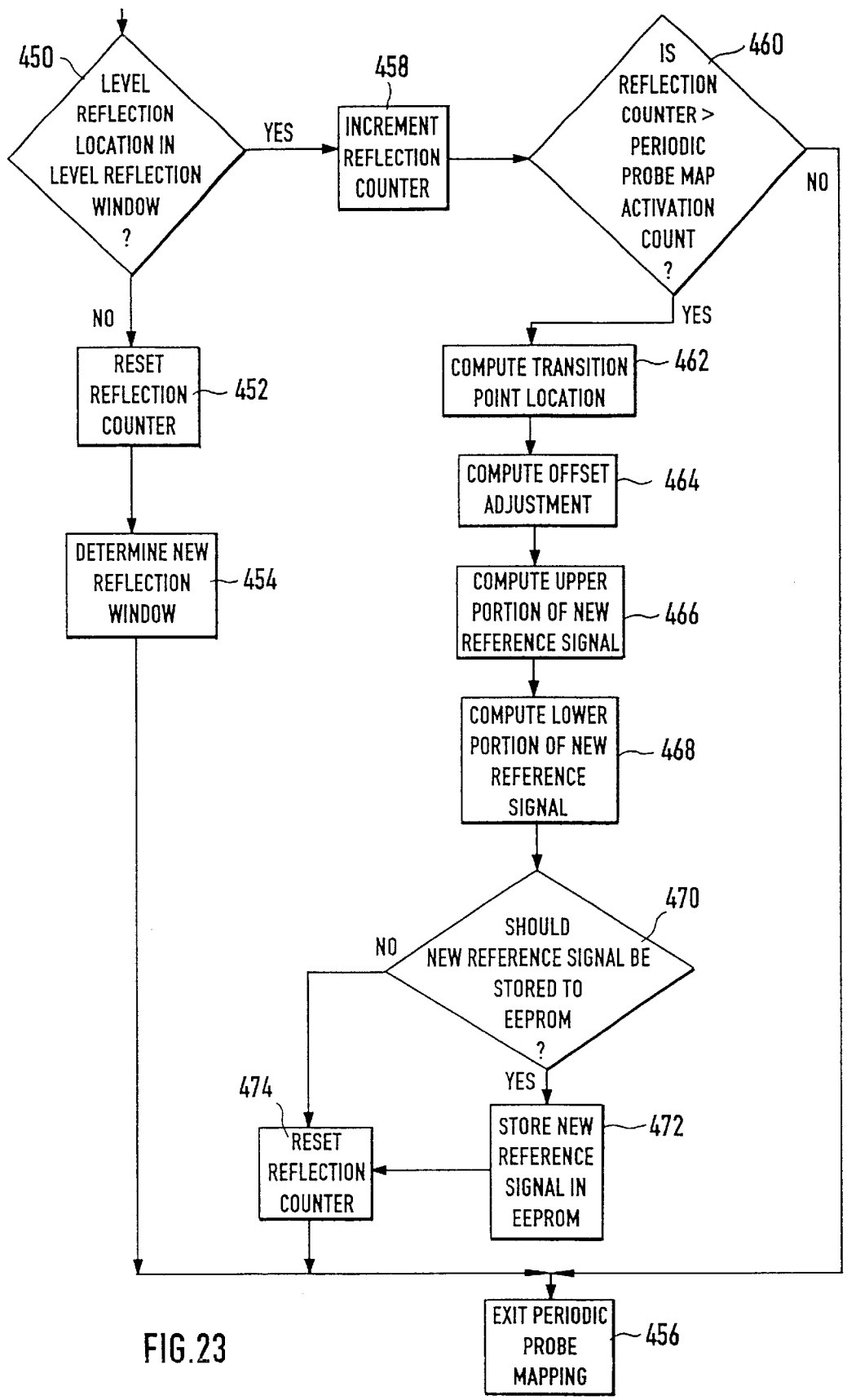
FIG. 23 shows a flow diagram of the steps used for implementing periodic probe mapping.

Using the preferred method, which reduces the amount of RAM 48 required for the system 10, periodic probe mapping is accomplished as outlined in FIG. 23. Upon entry to the periodic probe mapping routine, at step 450, the system determines whether the level reflection location 438 is in the level reflection window 444. If the level reflection location 438 is not in the level reflection window 444 then, at step 452, the reflection counter is reset, at step 454, the reflection window 444 is reset and, at step 456, the periodic probe mapping routine is exited.

If the level reflection location is in the level reflection window then, at step 458, the reflection counter is incremented and, at step 460, the system checks whether the reflection counter is greater than the periodic probe map activation count. If the reflection counter is not greater than the periodic probe map activation count then, at step 456, the periodic probe map routine is exited. If the reflection counter is greater than the periodic probe map activation count then periodic probe mapping is automatically activated starting at step 462.

At step 462, the location of the transition point 442 is determined and, at step 464, the transition point offset adjustment is computed using the points of the TDR signal 400 and the prior reference signal 410 to smooth the new reference signal 440 at the transition point 442. At step 466, the upper portion 408 of the new reference signal 440 is computed by reconstructing the TDR signal 400. The TDR signal 400 is reconstructed point by point up to the transition point 442 by taking the value of the prior reference signal 410 plus the value of the baseline signal 420 minus the baseline offset value. The reconstructed TDR signal value is the value of the new reference signal 440 and it is stored over the value of the prior reference signal 410. At step 468, the lower portion 418 of the new reference signal 440 is computed. The lower portion 418 of the new reference signal 440 is computed point by point by adding the transition point offset adjustment to each point of the prior reference signal 410 and storing the result over the point of the prior reference signal 410.

At step 470, the system determines whether the new reference signal 440 should be stored in EEPROM 50. If the new reference signal 440 is not to be stored in EEPROM 50 then, at step 474, the reflection counter is reset and, at step 456, the periodic probe mapping routine is exited. If the new reference signal 440 is to be stored in EEPROM 50 then, at step 472, the new reference signal 440 is stored in EEPROM 50, at step 474, the reflection counter is reset and, at step 456, the periodic probe mapping routine is exited.

A new "initial" periodic probe map reference signal may be stored in EEPROM 50 to reset or initialize the previous periodic probe map reference signal. Although the factory reference signal will be stored in EEPROM 50 as the initial reference signal for all modes, it is recommended, if possible (if the vessel is easily emptied), to compute a user reference signal for the entire probe map length 401. If the vessel is not easily emptied, a partial probe map should be performed to map the background reflections due to the measurement environment along the non-immersed portion of the probe 18. It is also important that the probe map length 401 is greater than or equal to the length of the probe 18. If the probe map length 401 is too short, the algorithms based on end of probe detection will not function properly.

In the level measurement calculations discussed above the TDR and reference signals are time aligned to the time of the initial reflection pulse caused by the impedance change at the mounting 16. The time alignment is done to set time zero, and correspondingly distance zero, to a fiducial reference point at the time of the reflection pulse from the mounting 16. The fiducial reference point is the point to which TDR signals and reference signals are aligned before calculation of the baseline signal and other computations are performed. The fiducial reference point is the reference for all distance calculations. Thus, time and distance measurements are calculated along the probe 18 starting at the location of the mounting 16 as identified by the fiducial reference point.

Figure 24:
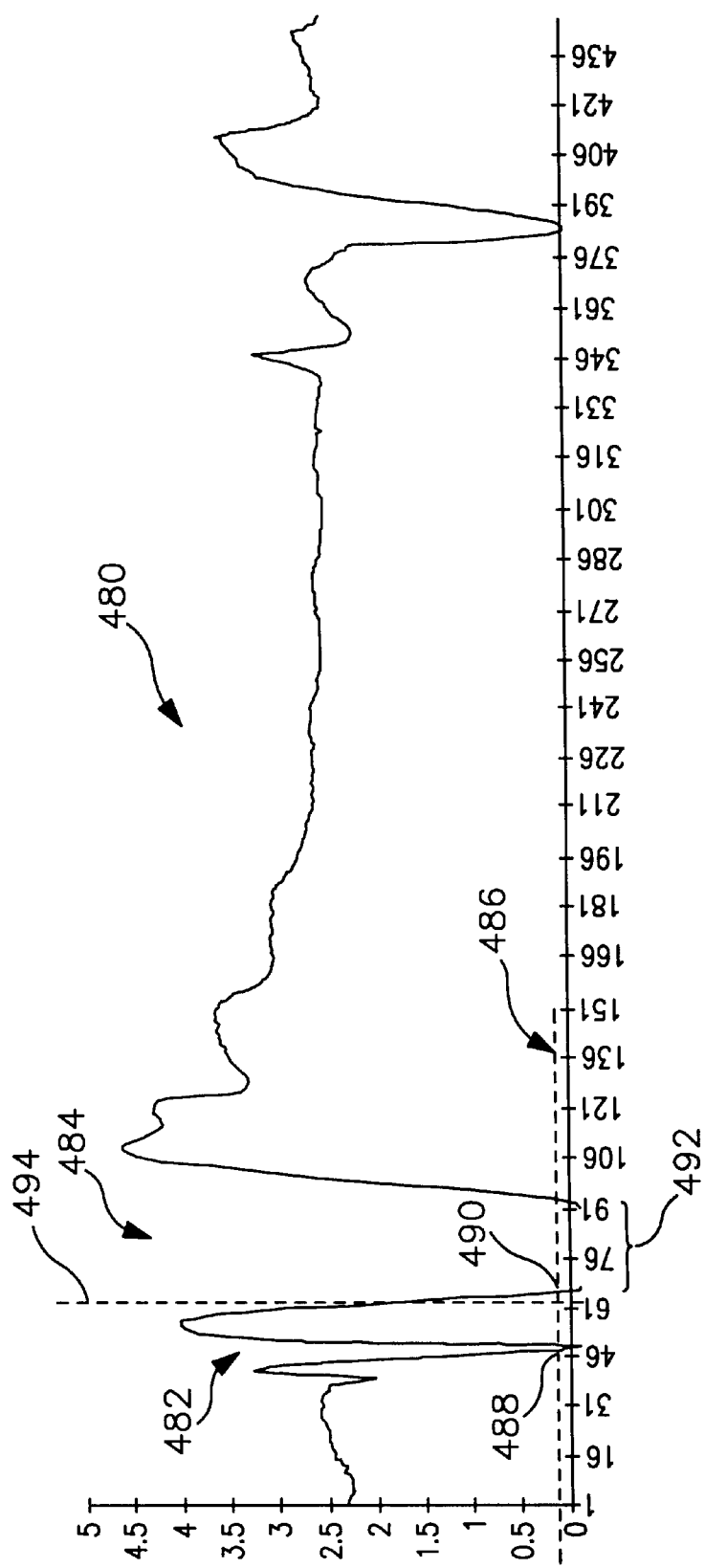
FIG. 24 shows a signal with a prefiducial reflection that crosses a fiducial threshold.

Under favorable conditions the fiducial reference point can be set to the first point falling below a selected fiducial threshold 486. In less favorable conditions, which may be caused by offsets and temperature drift, as shown in FIG. 24, a TDR signal 480 can contain a pre-fiducial reflection 482 and a fiducial reflection 484 due to the mounting 16 that both contain points falling below the fiducial threshold 486. The first point falling below the fiducial threshold 486 is a pre-fiducial reference point 488 in the pre-fiducial reflection 482 followed by a real fiducial reference point 490 in the fiducial reflection 484. The real fiducial reference point 490 due to the reflection signal of the mounting 16 occurs after the pre-fiducial reference point 488. During this condition, the fiducial reference point used in calculations can be incorrectly set to the pre-fiducial reference point 488 or, due to environmental factors, can toggle between the real fiducial reference point 490 and the pre-fiducial point 488. This toggling causes the reference signal to be misaligned with the TDR signal 480 which causes erroneous results. When the TDR signal 480 does not align with the reference signal, the baseline signal is corrupted and level reflections can not be accurately determined.

There are several procedures that can be used in overcoming the problem caused by multiple reflections crossing the fiducial threshold 486. Samples of the TDR signal 480 whose amplitude is evaluated as a zero value by the analog-to-digital convertor 44 are referred to as zero values.

One procedure for overcoming the problem caused by multiple reflections crossing the fiducial threshold 486 is to count the number of consecutive zero values, points whose amplitude is evaluated as a zero value by the analog-to-digital convertor 44, in each reflection in the TDR signal 480 containing zero values. The reflection with the greatest number of zero values is chosen as the fiducial reflection. Using this method on the TDR signal of FIG. 24, the number of zero values in the first reflection 482 and in the second reflection 484 would be counted. The reflection 484 would be selected as the fiducial reflection since it has a greater number of consecutive zero values. The fiducial reference point would then be set to the location 490 where the fiducial reflection 484 first crosses the fiducial threshold 486.

A second solution for overcoming the problem caused by multiple reflections crossing the fiducial threshold 486 is to determine the reflection that represents the greatest distance along the TDR signal 480 with consecutive zero values. This procedure would start like the previous procedure with a detecting of each point representing a zero value. However, instead of counting the raw number of points, the points would be transformed into a distance measure using the scan resolution factor. The uninterrupted distance of each reflection that is zero values would be tracked. The reflection in the TDR signal 480 which indicates the greatest uninterrupted distance of the TDR signal 480 made up of zero values is selected as the fiducial reflection. The fiducial reference point would then be set to the location where the selected fiducial reflection first crosses the fiducial threshold 486.

Figure 25:
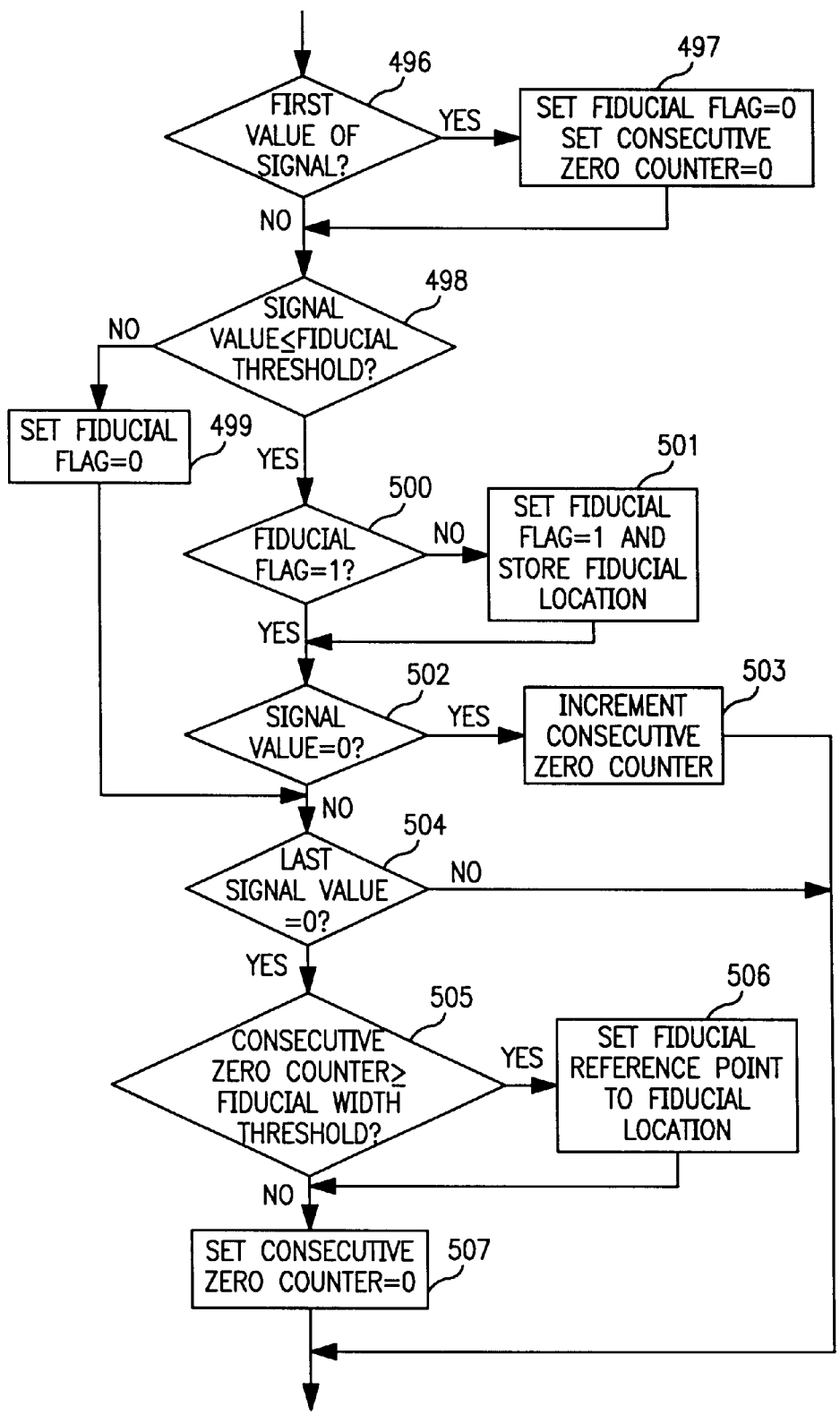
FIG. 25 shows a flow diagram for a processing procedure to overcome problems due to prefiducial reflections.

The preferred solution for overcoming the problem caused by multiple reflections crossing the fiducial threshold 486 is to set the fiducial reference point to the starting location of the rightmost string of consecutive zero values in the signal which is at least as wide as a user-defined fiducial width threshold. This can be performed on the TDR signal 480 as it is being received point by point by the microprocessor 46. Prior to this process, the fiducial width threshold is set which defines either the number of consecutive zero values that is required before the reflection will be considered a fiducial reflection, or the width in distance that is required before the reflection will be considered a fiducial reflection. A consecutive zero counter or distance counter is used to count the number of consecutive zeroes or the width in distance found in a potential fiducial reflection of the signal. The rightmost reflection in the TDR signal 480 which has a width of zero values greater than or equal to the fiducial width threshold is selected as the fiducial reflection. The fiducial reference point would then be set to the location where the selected fiducial reflection 484 first crosses the fiducial threshold 486. There are several ways to implement a procedure performing this function, an example being shown in FIG. 25 where the fiducial width threshold defines the number of consecutive zero values that is required before a reflection will be considered a fiducial reflection.

At step 496, the procedure checks to determine whether this is the first point of the incoming TDR signal 480. This is to initialize the fiducial flag and consecutive zero counter for a new incoming signal. If it is the first point then, at step 497, the fiducial flag is set to zero (0) and the consecutive zero counter is set to zero (0). The fiducial flag indicates whether the signal is currently in a potential fiducial reflection.

At step 498, the routine checks whether the current signal value, voltage count value, is less than or equal to the fiducial threshold. If the current signal value is not less than or equal to the fiducial threshold then, at step 499, the fiducial flag is set to zero (0) and control is transferred to step 504 to determine whether the last signal value was a zero value. If the current signal value is less than or equal to the fiducial threshold then the signal is in a potential fiducial reflection and control is transferred to step 500.

At step 500, the routine checks whether the fiducial flag equals one (1) indicating that the signal was already in a fiducial reflection. If the fiducial flag is not equal to one, then this is the first point in the fiducial reflection and, at step 501, the fiducial flag is set equal to one (1) and the fiducial location is stored. The fiducial location is the point where the potential fiducial reflection first crosses below the fiducial threshold.

At step 502, the routine checks whether the current signal value, voltage count value, is zero (0 voltage counts). If the current signal value is zero then, at step 503, the consecutive zero counter is incremented and the routine is exited until the next point of the TDR signal 480 is received by the microprocessor 46.

If the current signal value is not zero or is not below the fiducial threshold then, at step 504, the routine checks whether the last signal value was zero (0 voltage counts). If the last signal value was not a zero value then the routine is exited until the next point of the TDR signal 480 is received. If the last signal value was zero then the signal just finished going through at least one consecutive zero value and processing continues at step 505.

At step 505, the routine checks whether the consecutive zero counter is greater than or equal to the fiducial width threshold. This step is reached at the first non-zero point on the rising side of a string of at least one consecutive zero values, and at this instant, the consecutive zero counter contains a count of the number of consecutive zero values in the potential fiducial reflection. For example, for the fiducial reflection 484 of FIG. 24, the consecutive zero counter holds the count of the number of zero values in the region 492. If the consecutive zero counter is less than the fiducial width threshold, then the reflection is not considered and, at step 507, the consecutive zero counter is reset to zero and the routine is exited until the next point of the TDR signal 480 is received.

The fiducial reference point is set at step 506 when the consecutive zero counter is greater than or equal to the fiducial width threshold. At step 506, the fiducial reference point is set to the fiducial location which was stored at step 501. This sets the fiducial reference point to the first point below the fiducial threshold for the current fiducial reflection. At step 507, the consecutive zero counter is reset to zero and the process is exited until the next point of the TDR signal 480 is received. The process continues to check for potential fiducial reflections later in the TDR signal 480.

The ability to detect the end 19 of the probe 18 enables the detection and differentiation between an empty vessel, low amplitude level reflections, and a broken probe. Being able to detect and differentiate between these conditions allows the apparatus 10 to properly indicate when the vessel 14 is empty, when the vessel 14 is not empty but no level reflection is detected, and when the probe 18 is broken. The output 52 of the apparatus 10 includes an alarm which is activated when a broken probe condition or no level reflection condition is detected.

Figure 27:
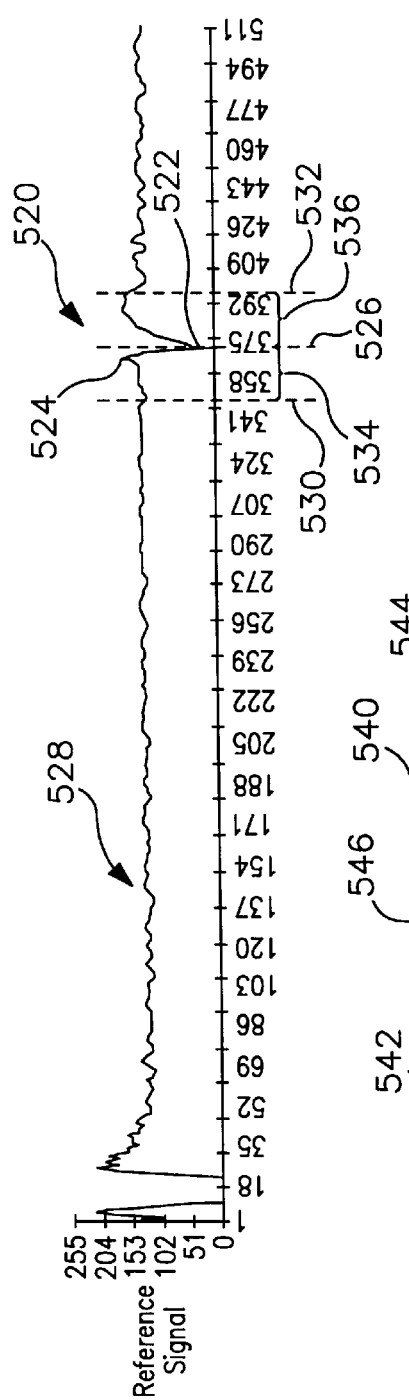
FIG. 27 shows a digital reference signal with emphasis on the end of probe reflection and associated parameters.
Figure 28:
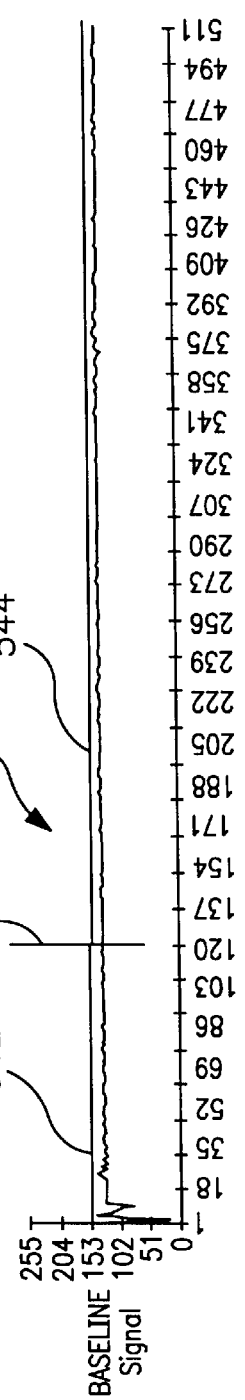
FIG. 28 shows a digital baseline signal with an upper threshold, a lower threshold and a threshold index.

As shown in FIGS. 27 and 28, an end of probe response 510, 520 caused by the end 19 of the probe 18 is characterized by a sharp negative peak 512, 522 usually adjacent to a positive peak 514, 524. The amplitudes of the negative peak 512, 522 and the positive peak 514, 524; and the distance between the negative peak 512, 522 and the positive peak 514, 524 can vary with the type of probe 18. For example, some factors that can cause the end of probe response 510, 520 to vary include whether the probe is coated or uncoated; whether the end of the probe has a weight or loop; and the diameter of the probe. The end of probe response 510, 520 is also affected by the field installation conditions.

The position of the end of probe response 510 of the TDR signal 508 provides information about the level 26 of material in the vessel 14 and the condition of the probe 18. The velocity of a pulse traveling on the probe 18 varies with the dielectric of the material in which the probe 18 is immersed. In the case of two materials, as shown in FIG. 1, the pulse travels along the probe 18 in the first material 11 having a first dielectric constant, and in the second material 12 having a second dielectric constant. Thus, the pulse has a first propagation speed in the first material 11 dependent upon the dielectric constant of material 11, and a second propagation speed in the second material 12 dependent upon the dielectric constant of material 12. Changes in the length of probe 18 and changes in the length of probe 18 immersed in the material 12 cause the position of the end of probe response 510 of the TDR signal 508 to vary. The change in position of the end of probe response 510 of the TDR signal 508 is perceived as a distance change to the end 19 of the probe 18. The method for detecting and differentiating an empty vessel 14, a low amplitude level reflection, and a broken probe 18 are based on the position of the end of probe response 510 of the TDR signal 508 versus the end of probe response 520 of the reference signal 528.

During determination of the reference signal 528, the position of the end 19 of the probe 18 is determined and stored in EEPROM 50. An end of probe position 526 indicating the position of the end 19 of the probe 18 is set by the location of the negative peak 522 of the end of probe response 520. The end of probe position 526 is used to calculate a measuring length 530 and a maximum probe length 532.

The measuring length 530 is calculated as the end of probe position 526 minus a shortening tolerance 534. In the case of a typical weight length of 25 cm and a worst case resolution of approximately ±5 cm, a value of 30 cm is appropriate for the shortening tolerance 534. The measuring length 530 has an allowable range from a short limit of 1.0 m to a long limit of the end of probe position 526 minus the shortening tolerance 534. The short limit prevents measurements in the region dominated by reflections from the mounting 16 and the long limit prevents measurements in the region dominated by the end of probe reflection 520. The measuring length 530 can be manually reduced by the user up to the short limit, but the measuring length 530 can not be manually increased by the user.

The measuring length 530 computed during update of the reference signal 528 is used as a blocking distance during analysis of the TDR signal 508. Reflections in the TDR signal 508 that are beyond the measuring length 530 are not considered in determining material level. This prevents the system from falsely detecting the ghost reflections from the end 19 of the probe 18 as level reflections. The measuring length 530 is also used when the user shortens the probe 18, but is unable to create a new reference signal. The manual reduction of measuring length 518 allows the system to function, without mapping the shortened probe 18.

The maximum probe length 532 is calculated during the update of the reference signal 528 as the end of probe position 526 plus a lengthening tolerance 536. The lengthening tolerance 536 is used to differentiate between an empty vessel condition and a low amplitude level reflection condition. The lengthening tolerance 536 compensates for the effects of material build-up on the probe 18 and the dielectric of the materials in the vessel 14, which change the propagation speed of a signal along the probe 18. A value for the lengthening tolerance 536 of 30 cm has been found to be appropriate.

Figure 26:
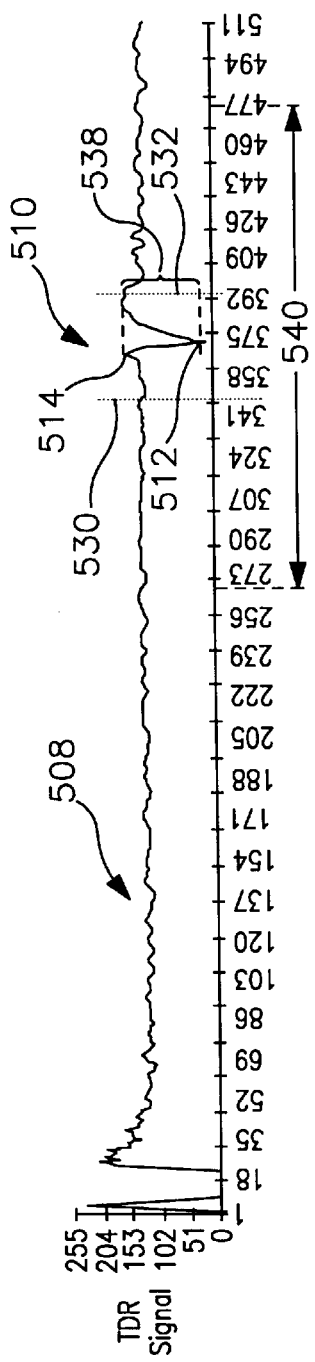
FIG. 26 shows a digital TDR signal with emphasis on the end of probe reflection and associated parameters.

The measuring length 530 and the maximum probe length 532 divide the sampled TDR signal 508, FIG. 26, and the reference signal 528, FIG. 27, into three sections. These values are calculated based upon the end of probe position 526 which is stored in EEPROM 50 during each update to the reference signal 528. Different conditions are determined based on which of the three sections the negative peak 512 of the end of probe response 510 of the current TDR signal 508 is located in.

The end of probe response 510 and a broken probe response are very similar. In fact, a broken probe is just another type of end 19 for the probe 18. The end of probe position 526, stored in EEPROM 50, represents the location of the end 19 of the probe 18 when the vessel 14 is empty, which is the minimum location along the TDR signal 508 of the negative peak 512 of the end of probe response 510. One of the conditions for detecting a broken probe is detection of a shortened probe length which is indicated by the location of the negative peak 512 of the end of probe response 510 being a shorter distance on the TDR signal 508 than the stored end of probe position 526 computed during determination of the reference signal 528. A broken probe condition could be caused by a broken probe or a lost weight at the end of the probe.

Broken probe detection is complicated by the fact that users will shorten the length of the probe 18 in the field, without determining a new reference signal for the probe 18. This is sometimes necessitated by the impracticality of emptying the vessel 14 to determine a new reference signal for the shortened probe 18. If the system used the stored end of probe location 426, then shortening of the probe 18 in the field without determining a new reference signal would cause a broken probe indication. Therefore, an adjustable criteria for broken probe detection is implemented. The measuring length 530 is used as the criteria for broken probe detection. If the negative peak 512 of the end of probe response 510 of the current TDR signal 508 occurs prior to the measuring length 530 then the system outputs a broken probe indication. The measuring length 530 is stored in EEPROM 50 and can be manually decreased by the user. This allows the user to adjust the region of the TDR signal 508 in which a broken probe condition is detectable.

There are three conditions that all must be met to produce a broken probe indication. First, as discussed above, the current end of probe location determined by the location os the negative peak 512 of the end of probe response 510 of the current TDR signal 508 must be less than the stored measuring length 526. The second is that the end of probe response 510 must consist of a negative peak followed by a positive peak. This is to prevent large level reflection pulses from being misinterpreted as a broken probe condition. The third condition is that an end of probe peak-to-peak response 538 between the voltage counts of the negative peak 512 and the voltage counts of the positive peak 514 of the end of probe response 510 must be greater than or equal to an end of probe delta response value. The preferred value for the end of probe delta response is 800 mV, which for a voltage count of 20 mV is equivalent to 40 voltage counts.

When the vessel 14 is empty there is no level reflection pulse which could cause the system to make an erroneous level measurement based on system noise. Threshold level reflection values are used in analysis of a baseline signal 540 to prevent finding a level reflection in the signal noise when the vessel 14 is empty. The baseline signal 540 (FIG. 28) is calculated by subtracting the time-aligned reference signal 528 (FIG. 27) from the time-aligned TDR signal 508 (FIG. 26). An upper threshold 542 is applied to the upper portion of the baseline signal 540, and a lower threshold 544 is applied to the lower portion of the baseline signal 540. A threshold index 546 divides the portion of the baseline signal 540 over which the upper threshold 542 is used from the portion of the baseline signal 540 over which the lower threshold 544 is used.

The upper threshold 542 is greater than the lower threshold 544 due to the greater amplitudes and slopes of the TDR signal 508 and the reference signal 528 on the upper portion of the signals caused by the fiducial reflections from the mounting 16 and environmental factors in the vessel 14 near the fiducial. Small errors in time alignment in these regions of high amplitude and slope cause larger noise amplitudes in the resulting baseline signal which the upper threshold is intended to mask. The threshold values can be set as a function of the amplitude of the level reflection, for example a fixed number of counts below the amplitude of the last level reflection. Alternatively, the thresholds can be set to a preset level. For example, with the baseline offset set to 128 voltage counts, the upper threshold could be set to 145 counts and the lower threshold set to 133 counts. The threshold index can be set as a function of the probe length or as a fixed value, for example 2 meters.

If there are no reflection pulses that cross the upper threshold 542 or the lower threshold 544 in the baseline signal 540, then it must be determined whether this indicates an empty vessel 14 or low amplitude level reflections. The two conditions can be differentiated based on the fact that the propagation speed of the signal along the probe 18 changes based on the material in which the probe 18 is immersed. If the probe 18 is immersed in a material the location of the negative peak 512 of the end of probe response 510 will move from the end of probe position 526 for an empty vessel. Buildup of material on the probe 18 which remains after the material level has lowered will also effect the signal propagation speed along the probe 18. To account for the effects of material buildup, the probe maximum length 532 is used to differentiate between an empty vessel condition and a low amplitude level reflection condition. If the end of probe position 526 was used as the decision criteria, then material buildup on the probe 18 could cause the system to confuse an empty vessel condition with a low amplitude level reflection condition.

There are two conditions that must be met to determine a low amplitude level reflection condition. First, the negative peak 512 of the end of probe response 510 must shift beyond the probe maximum length 532, indicating that the material in which the probe 18 is immersed has changed the signal propagation speed. Second, there must be no reflections in the baseline signal 540 above the upper threshold 542 in the upper portion of the baseline signal 540 or above the lower threshold 544 in the lower portion of the baseline signal 540. When both of these conditions are met the system indicates a low amplitude level reflection condition.

There are two conditions that must be met to determine an empty vessel condition. First, the negative peak 512 of the end of probe response 510 must be within the window between the measuring length 530 and the probe maximum length 532. Second, there must be no reflections in the baseline signal 540 above the upper threshold 542 in the upper portion of the baseline signal 540 or above the lower threshold 544 in the lower portion of the baseline signal 540. When both of these conditions are met the system indicates an empty vessel condition.

Figure 29:
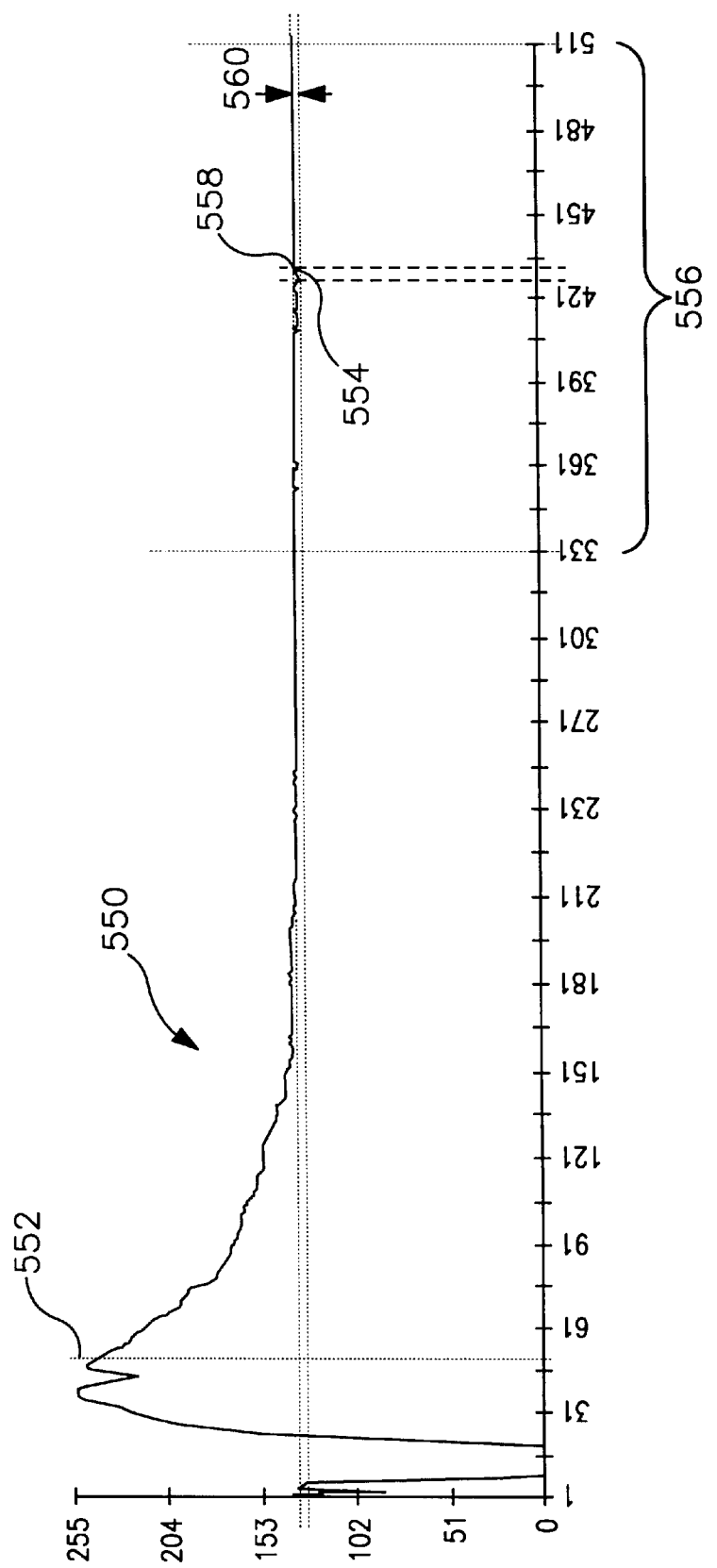
FIG. 29 shows a digital TDR signal after loss of the high frequency connection.

The shape of the end of probe response is used to determine the loss of the high frequency connection. When the high frequency connection is lost the end of probe delta value on a TDR signal 550 becomes very small as shown in FIG. 29. This is due to the fact that without a high frequency connection there are no significant reflection pulses past the fiducial.

Using the TDR signal of FIG. 27, which has high frequency connection, the determination of end of probe response shape will be shown. During level measurement, the TDR signal 508 is analyzed from a blocking distance 552 to the last sample, sample 511 in this case. The blocking distance 552 is a set distance from the fiducial reference point, for example 30 cm. The end of probe location is determined using the negative peak 512 of the end of probe response 510. The system then looks for the positive peak 514 of the end of probe response 510 within an end of probe window 540 about the negative peak 512. The end of probe window 540 prevents a point on the falling slope of the fiducial reflection pulse from being used as the positive peak of the end of probe response. In the case of sampling 512 digital samples along the TDR signal 508, the preferred size of the end of probe window 540 is 100 distance counts to either side of the negative peak 512. If the end of probe peak-to-peak response 538 is less than an end of probe delta threshold, then the system indicates a loss of high frequency connection. A preferred value for the end of probe delta threshold is 5 voltage counts when the voltage count size is approximately 20 mV.

FIG. 29 shows a TDR signal 550 after the high frequency connection has been lost. The system looks for the location of the end of probe response and finds a negative peak 554. The system then looks for the positive peak within the end of probe window 556 and finds positive peak 558. Since, in FIG. 29, the end of probe peak-to-peak response 560 is less than the end of probe delta threshold, the system indicates a loss of high frequency connection.

Figure 30:
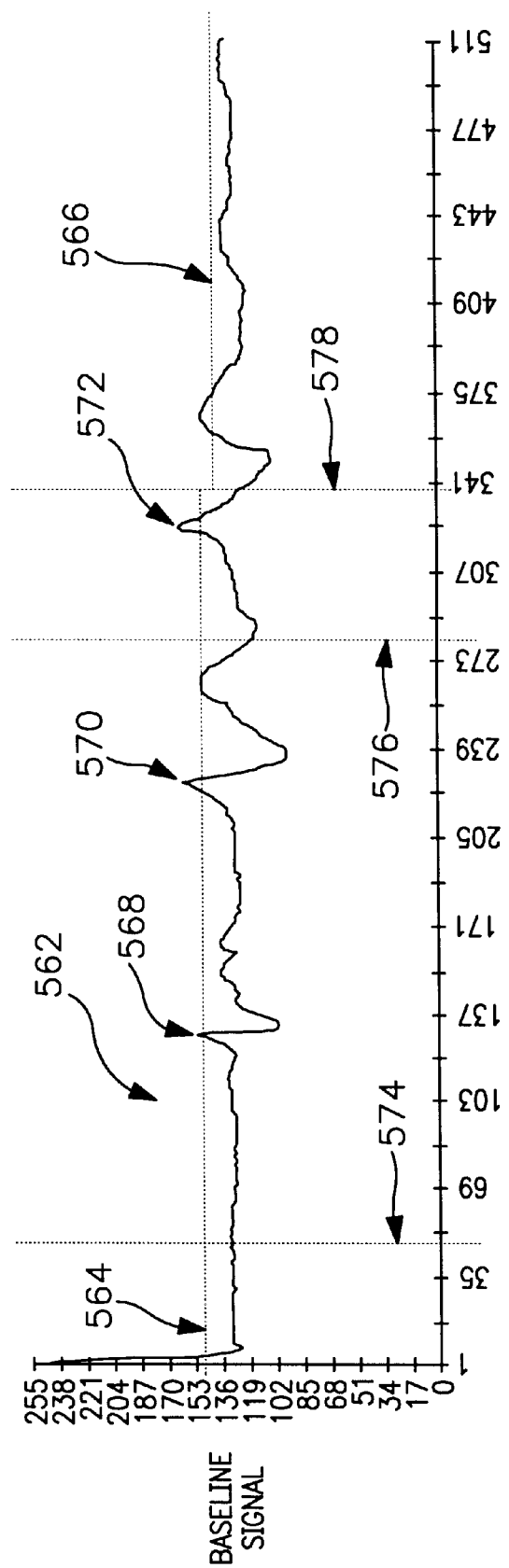
FIG. 30 shows a digital baseline signal with low signal-to-noise ratio.

Referring to FIG. 30, an upper threshold signal level 564 and lower threshold signal level 566 are used in analysis of a baseline signal 562. Under favorable conditions with high signal to noise ratio, the level reflection pulse is the first pulse to cross either of the thresholds 564, 566. FIG. 30 shows a case of low signal to noise ratio where a noise reflection pulse 568, a level reflection pulse 570 and an ghost reflection pulse 572 from the end of probe reflection all cross the threshold 564. FIG. 30 also shows the blocking distance 564, the measuring length 576 and the threshold index 578.

The threshold can be set to a fixed level or it can be set as a function of the amplitude of the level reflection pulse of the previous signal. In the latter case, if the previous baseline signal was baseline signal 562, then the amplitude of level reflection pulse 570 would be computed and the upper threshold 564 would be set to a fixed number of voltage counts lower, for example 4 counts (~80 mV when each count is ~20 mV), and the lower threshold 566 would be set still lower, for example 8 counts. These new thresholds 564, 566 would be used in determining the level reflection pulse in the next baseline signal.

The level measurement is determined by the maximum amplitude pulse of the baseline signal 562 that crosses the thresholds 564, 566 between the blocking distance 574 and the measuring length 576. In FIG. 30, the noise pulse 568, the level reflection pulse 570 and the ghost reflection pulse 572 all cross the threshold 564. Even though the amplitude of the ghost reflection pulse 572 is greater than the amplitude of the level reflection pulse 570, it is beyond the measuring length 576 and therefore not considered when performing level measurement. The noise pulse 568 and the level reflection pulse 570 both occur between the blocking distance 574 and the measuring length 576, but the amplitude of the level reflection pulse 570 is greater than the amplitude of the noise pulse 568. Therefore, the level reflection pulse 570 is used to determine the level in the vessel 14.

Figure 31:
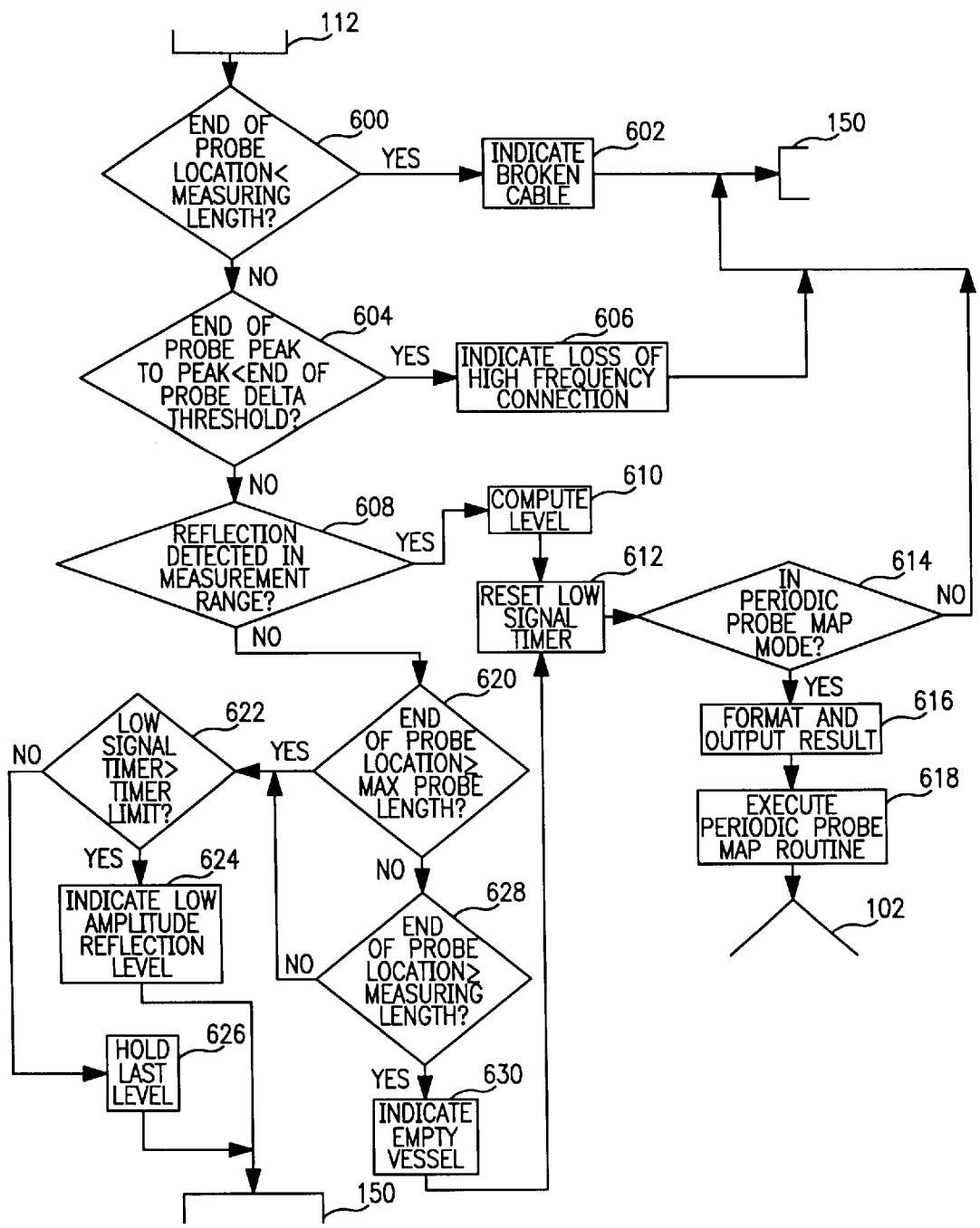
FIG. 31 shows a flow diagram of the steps used for implementing diagnostic and detection routines including broken cable detection, loss of high frequency connection, valid material level reflection, activating periodic mapping when in periodic map mode, low amplitude level reflection and empty vessel detection.

The above diagnostic and level measurement techniques are implemented as shown in FIG. 31. The partially drawn boxes shown in FIG. 31 for steps 102, 112, and 150 refer to the steps by those same numbers which are shown in FIG. 8. In the following discussion, reference is made to the TDR signal 508 shown in FIG. 26 and the baseline signal 562 shown in FIG. 30.

At step 600 of FIG. 31, following the time alignment of data in step 112 of FIG. 8, the system checks for a broken probe 18. Step 600 checks whether the end of probe location 526 is less than, occurs prior to, the measuring length 530. If the end of probe location 526 does occur prior to the measuring length 530, then, at step 602, a broken probe is indicated and control is transferred to step 150 shown in FIG. 8.

If a broken probe 18 is not detected then, at step 604, the system checks whether there has been a loss of high frequency connection. At step 604, the system determines whether the end of probe peak-to-peak response 538 is less than the end of probe delta threshold. If the end of probe peak-to-peak response 538 is less than the end of probe delta threshold then, at step 606, the system indicates loss of high frequency connection and transfers control to step 150 of FIG. 8.

If a loss of high frequency connection is not detected then, at step 608, the system checks whether there is a level reflection in the measurement range. At step 608, the system checks whether a reflection is detected in the measurement range. A reflection is detected when the amplitude of the reflection pulse in the baseline signal is greater than the upper threshold 564 or the lower threshold 566. The measurement range extends from the blocking distance 574 to the measuring length 576. If a reflection pulse is detected in the measurement range then, at step 610, the level of the material 12 in the vessel 14 is computed. Various methods for determining the level of the material 12 in the vessel 14 are shown in steps 114–144 of FIG. 8.

After the material level is computed, at step 612, a low signal timer, which will be described below, is reset. Then at step 614, the system checks whether it is in periodic map mode. If the system is in periodic map mode then the reference signal is automatically updated on a periodic basis, otherwise the reference signal is not updated without user intervention. If the system is not in periodic map mode, control is transferred to step 150 of FIG. 8. If the system is in periodic map mode then, at step 616, the level measurement result is formatted and output, and at step 618, the periodic probe map routine shown in FIG. 23 is executed. After the periodic probe map routine is complete, control is transferred to step 102 shown in FIG. 8.

If a level reflection is not detected in the measurement range then, at step 620, the system checks whether there is a low amplitude level reflection condition. At step 620, the system checks whether the end of probe location on the TDR signal is greater than or equal to, occurs at or beyond, the maximum probe length 532. The end of probe location on the TDR signal 508 is indicated by the negative peak 512 of the end of probe response 510. If the end of probe location of the TDR signal occurs at or beyond the maximum probe length 532 then it is a low amplitude level reflection condition. The low signal timer tracks the time since the last valid level reflection, either within the measurement range or an empty vessel, was detected. A timer limit that is set by the user indicates how long a low amplitude level reflection condition will be tolerated before an alarm or other output is activated.

When a low amplitude level reflection condition is detected then, at step 622, the system checks whether the low signal timer is greater than the timer limit. If the low signal timer is greater than the timer limit then, at step 624, the system activates the necessary output to indicates a low amplitude reflection level condition and returns control to step 150 shown in FIG. 8. If the low signal timer is not greater than the timer limit, then, at step 626, the system continues to display the last level measurement value and returns control to step 150 shown in FIG. 8.

If a low amplitude level reflection condition is not detected then, at step 628, the system checks whether there is an empty vessel 14. At step 628, the system checks whether the end of probe location of the TDR signal is greater than or equal to, occurs at or beyond, the measuring length 530. The end of probe location on the TDR signal 508 is indicated by the negative peak 512 of the end of probe response 510. If the end of probe location of the TDR signal occurs at or beyond the measuring length 530 then, at step 630, the system indicates an empty vessel, which is a valid level measurement, and control is transferred to step 612 to reset the low signal timer. If the end of probe does not occur at or beyond the measuring length 530 then it is treated as a low level reflection condition and control is transferred to step 622 to determine whether the low signal timer is greater than the timer limit.

Although the invention has been described in detail with reference to a certain preferred embodiment, variations and modifications exist within the scope and spirit of the present invention as described and defined in the following claims.

What is claimed is:

1. A method for processing a time domain reflectometry (TDR) signal having a plurality of reflection pulses to generate a valid output result corresponding to a process variable for a material in a vessel, said method comprising the steps of:

determining a reference signal along a probe in said vessel;

establishing a reference end of probe location using said reference signal;

periodically detecting a TDR signal along said probe;

determining a detected end of probe location on said TDR signal;

attempting to detect a process variable reflection on said TDR signal;

determining a system status based upon said reference end of probe location, said detected end of probe location and said process variable reflection; and computing said output result when said system status is functional.

2. The method of claim 1 further comprising the step of indicating a broken cable when said detected end of probe location is less than said reference end of probe location.

3. The method of claim 1 further comprising the steps of establishing a measuring length which is less than said reference end of probe location; and indicating a broken cable when said detected end of probe location is less than said measuring length.

4. The method of claim 1 further comprising the steps of establishing an end of probe peak to peak threshold; detecting an end of probe negative peak and an end of probe positive peak on said TDR signal; computing an end of probe peak to peak amplitude as the difference between said end of probe negative peak and said end of probe positive peak; and indicating a loss of high frequency connection condition when said end of probe peak to peak amplitude is less than said end of probe peak to peak threshold.

5. The method of claim 1 wherein said system status is functional when said end of probe reference location is less than or equal to said detected end of probe location and a process variable reflection is detected prior to said end of probe reference location.

6. The method of claim 1 further comprising the step of establishing a measuring length which is less than said reference end of probe location; and wherein said system status is functional when said end of probe reference location is less than or equal to said detected end of probe location and a process variable reflection is detected prior to said measuring length.

7. The method of claim 1 further comprising the steps of establishing a maximum probe length which is greater than said reference end of probe location; and indicating a low amplitude reflection condition when said detected end of probe location is greater than or equal to said maximum probe length, and said process variable reflection is not detected.

8. The method of claim 1 further comprising the steps of establishing a maximum probe length which is greater than said reference end of probe location; establishing a low signal timer which is reset when at least one of said process variable reflection is detected and an empty vessel condition is detected; indicating a low amplitude reflection condition when said detected end of probe location is greater than or equal to said maximum probe length, said process variable reflection is not detected and said low signal timer is greater than or equal to a low signal timer limit; and continuing to hold said output result computed from said prior TDR signal when said detected end of probe location is greater than or equal to said maximum probe length, said process variable reflection is not detected and said low signal timer is less than said low signal timer limit.

9. The method of claim 1 further comprising the steps of establishing a measuring length which is less than said reference end of probe location; establishing a maximum probe length which is greater than said reference end of probe location; and indicating an empty vessel condition when said process variable reflection is not detected, said detected end of probe location is greater than or equal to said measuring length and said detected end of probe location is less than or equal to said maximum probe length.

10. The method of claim 1 further comprising the steps of establishing a first fiducial reference point on said reference signal; scanning said TDR signal for at least one potential fiducial reflections having a zero value; selecting a fiducial reflection from said at least one potential fiducial reflections; and setting a second fiducial reference point on said fiducial reflection; whereby distances and locations on said reference signal are measured from said first fiducial reference point, and distances and locations on said TDR signal are measured from said second fiducial reference point.

11. An apparatus for processing a time domain reflectometry (TDR) signal having a plurality of reflection pulses to generate a valid output result corresponding to a process variable for a material in a vessel, said apparatus comprising:

means for determining a reference signal along a probe in said vessel;

means for establishing a reference end of probe location using said reference signal;

means for periodically detecting a TDR signal along said probe;

means for determining a detected end of probe location on said TDR signal;

means for attempting to detect a process variable reflection on said TDR signal;

means for determining a system status based upon said reference end of probe location, said detected end of probe location and said process variable reflection; and means for computing said output result when said system status is functional.

12. The apparatus of claim 11 further comprising means for establishing a measuring length; and means for indicating a broken cable when said detected end of probe location is less than said measuring length.

13. The apparatus of claim 11 further comprising means for detecting an end of probe negative peak and an end of probe positive peak on said TDR signal; means for computing an end of probe peak to peak amplitude as the difference between said end of probe negative peak and said end of probe positive peak; and means for indicating a loss of high frequency connection condition when said end of probe peak to peak amplitude is less than an end of probe peak to peak threshold.

14. The apparatus of claim 11 further comprising means for establishing a measuring length, wherein said system status is functional when said end of probe reference location is less than or equal to said detected end of probe location and a process variable reflection is detected prior to said measuring length.

15. The apparatus of claim 11 further comprising means for establishing a maximum probe length; and means for indicating a low amplitude reflection condition when said detected end of probe location is greater than or equal to said maximum probe length, and said process variable reflection is not detected.

16. The apparatus of claim 11 further comprising a low signal timer which is reset when at least one of said process variable reflection is detected and an empty vessel condition is detected; wherein said means for determining a system status takes into account said low signal timer.

* * * * *